(12) United States Patent
Uesugi et al.

(10) Patent No.: US 7,236,658 B2
(45) Date of Patent: Jun. 26, 2007

(54) OPTICAL SWITCH

(75) Inventors: Tomoki Uesugi, Kyoto (JP); Yoichi Nakanishi, Kyoto (JP); Kazuki Fukuda, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/516,390

(22) PCT Filed: Jun. 27, 2003

(86) PCT No.: PCT/JP03/08187

§ 371 (c)(1),
(2), (4) Date: Jul. 26, 2005

(87) PCT Pub. No.: WO2004/003623

PCT Pub. Date: Jan. 8, 2004

(65) Prior Publication Data

US 2006/0039645 A1 Feb. 23, 2006

(30) Foreign Application Priority Data

Jul. 1, 2002 (JP) ............................. 2002-192368

(51) Int. Cl.
*G02B 6/26* (2006.01)
(52) U.S. Cl. .............................. 385/18; 385/15; 385/16
(58) Field of Classification Search ............. 385/15–18
See application file for complete search history.

(56) References Cited

U.S. PATENT DOCUMENTS 6,094,293 A  7/2000 Yokoyama
6,796,718 B2 * 9/2004 Jones et al. .................. 385/57

FOREIGN PATENT DOCUMENTS

JP  2003-295072  10/2003

* cited by examiner

*Primary Examiner*—Jennifer Doan
(74) *Attorney, Agent, or Firm*—Osha liang LLP

(57) ABSTRACT

A first light reflection surface (51) and a second light reflection surface (52) are formed on a lower half of a mirror block (50) in a state that these light reflection surfaces (51), (52) make 90 degrees therebetween. A first light reflection surface (51) and a second light reflection surface (52) are also formed on an upper half of the mirror block (50) in a state that these light reflection surfaces (51), (52) make 90 degrees therebetween. A third light reflection surface (53) and a fourth light reflection surface (54) are formed between the first light reflection surface (51) and the second light reflection surface (52) such that these light reflection surfaces (53), (54) make 90 degrees therebetween. According to this optical switch, by changing a region which reflects the light between the upper half and the lower half of the mirror block (50), the coupling relationship between an input optical fiber and an output optical fiber can be changed over.

7 Claims, 21 Drawing Sheets

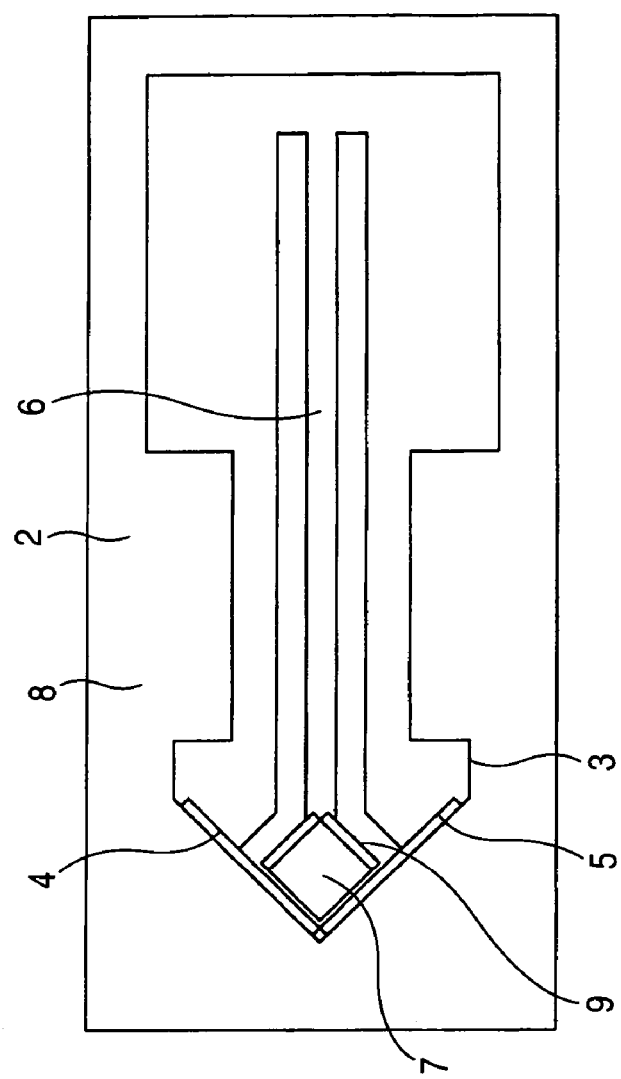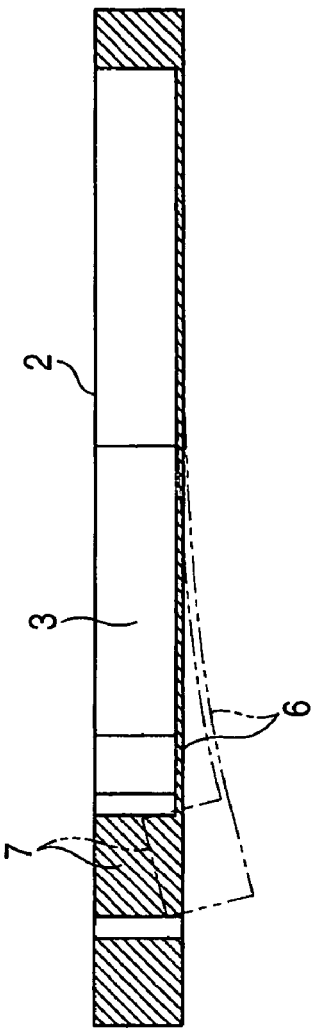
FIG. 1A
FIG. 1B

OPTICAL SWITCH

TECHNICAL FIELD

The present invention relates to an optical switch which serves to change over the coupling relationship between an input optical path (for example, an input optical fiber) and an output optical path (for example, an output optical fiber).

BACKGROUND ART

In the field of optical communication, an optical switch is used for changing over an optical fiber transmission path or a light transmission/reception terminal device or the like. Views shown in FIG. 1(a) and FIG. 1(b) are a plan view and a cross-sectional view for explaining the structure of a main part of a 2×2 type optical switch which has been proposed conventionally. In this optical switch, a recessed portion 3 is formed in a flat-panel like switch board 2 and a first and second light reflection surfaces 4, 5 are formed on inner surfaces of the recessed portion 3 such that these reflection surfaces 4, 5 make an angle of 90 degrees. Further, an elongated resilient member 6 is formed on a bottom surface of the switch board 2 in a cantilever manner, wherein a distal end of the resilient member 6 having resiliency is fixed to a cubic movable reflection member 7. The movable reflection member 7 is arranged to be positioned in an inner corner portion constituted by the first and second light reflection surfaces 4, 5. Further, a third and fourth light reflection surfaces 8, 9 are formed on two neighboring surfaces of the movable reflection member 7. The resilient member 6 is configured, as shown in FIG. 1(b), bendable in the up-and-down directions and the movable reflection member 7 which is positioned in the inner corner portion of the first and second light reflection surfaces 4 is lowered more downwardly than the first and second light reflection surfaces 4, 5 along with the downward bending of the resilient member 6. Although not shown in the drawings, an electromagnet is arranged below the switch board 2, wherein when the electromagnet is energized, the resilient member 6 is attracted downwardly and hence, the movable reflection member 7 is lowered downwardly, while when the electromagnet is deenergized, the resilient member 6 is attracted upwardly and hence, the resilient member 6 returns upwardly whereby the movable reflection member 7 returns in front of the first and second light reflection surfaces 4, 5.

FIG. 2(a), (b) are views for explaining the changeover operation of the above-mentioned optical switch. In this example, a first input optical fiber 10 is arranged to face the first light reflection surface 4 in an opposed manner, a second input optical fiber 11 is arranged to face the fourth light reflection surface 9 in an opposed manner, a first input optical fiber 12 is arranged to face the third light reflection surface 8 in an opposed manner, and the second input optical fiber 13 is arranged to face the second light reflection surface in an opposed manner.

Here, when the movable reflection member 7 is elevated and is positioned in front of the first and second light reflection surfaces 4, 5, as shown in FIG. 2(a), a light 14 radiated from the first input optical fiber 10 is reflected on the first light reflection surface 4 and the third light reflection surface 8 and, thereafter, is coupled to the first output optical fiber 12. A light 15 radiated from the second input optical fiber 11 is reflected on the fourth light reflection surface 9 and the second light reflection surface 5 and, thereafter, is coupled to the second output optical fiber 13.

Further, when the movable reflection member 7 is lowered and is not positioned in front of the first and second light reflection surfaces 4, 5, as shown in FIG. 2(b), the light 14 radiated from the first input optical fiber 10 is reflected on the first light reflection surface 4 and the second light reflection surface 5 and, thereafter, is coupled to the second output optical fiber 13. The light 15 radiated from the second input optical fiber 11 is reflected on the second light reflection surface 5 and the first light reflection surface 4 and, thereafter, is coupled to the first output optical fiber 12.

Accordingly, in the optical switch having such a constitution, by elevating and lowering the movable reflection member 7 by driving the resilient member 6 with the electromagnet, the coupling destinations of the lights radiated from the first input optical fiber 10 and the second input optical fiber 11 can be changed over between the first output optical fiber 12 and the second output optical fiber 13.

However, in the optical switch having such a structure, since the first and second light reflection surfaces 4, 5 and the third and fourth light reflection surfaces 8, 9 are formed on different members (inner surfaces of the recessed portion of the switch board 2 and the movable reflection member 7), in an assembling step of the optical switch and at the time of coupling the optical switch and the optical fiber, the positioning of the respective light reflection surfaces and the optical fiber becomes extremely cumbersome and hence, these operations become difficult to perform.

To explain the above more specifically, it is as follows. First of all, in a state before mounting the movable reflection member 7 on the resilient member 6, the first and the second input optical fibers 10, 11 and the first and the second output optical fibers 12, 13 are arranged parallel to each other and, thereafter, as shown in FIG. 2(b), the positions of centers of four optical fibers 10, 11, 12, 13 are aligned with each other for every combination of inputting and outputting of lights such that the light 15 which is radiated from the second input fiber 11 is incident on the first output optical fiber 12 and the light 14 which is radiated from the first input optical fiber 10 is incident on the second output optical fiber 13 and, in a post center-alignment state, the respective optical fibers 10, 11, 12, 13 are fixed by solidifying them with an adhesive agent or the like. Next, the movable reflection member 7 is arranged in front of the second input optical fiber 11 and the first output optical fiber 12 and a position and an angle of the movable reflection member 7 are adjusted by moving the movable reflection member 7. As shown in FIG. 2(a), when the position and the angle of the movable reflection member 7 are adjusted with respect to the respective optical fibers 10, 11, 12 and 13 such that the light 14 radiated from the first input optical fiber 10 is incident on the first output optical fiber 12 and the light 15 radiated from the second input optical fiber 11 is incident on the second output optical fiber 13, the movable reflection member 7 is fixed to an upper surface of the distal end portion of the resilient member 6 using an adhesive agent or the like while holding the state.

However, in the state that the movable reflection member 7 is not yet mounted on the resilient member 6, the centers of the respective optical fibers 10, 11, 12 and 13 are aligned with each other and, thereafter, the respective optical fibers 10, 11, 12 and 13 are fixed. Accordingly, in the adjustment of the position and the angle of the movable reflection member 7 in front of the optical fibers 11, 12, the positional relationship among the optical fibers 10, 11, 12 and 13 cannot be changed and hence, it is difficult to adjust the position and the angle of the movable reflection member 7 with high accuracy. Further, when there exist irregularities with respect to the positions of the first light reflection surface 4 and the second light reflection surface 5, there also arise the irregularities with respect to the positions of the optical fibers 10, 11, 12 and 13 which are determined by reference to the light reflection surfaces 4, 5 and hence, the adjustment of the position and the angle of the movable reflection member 7 become further complicated. Accordingly, with respect to the optical switch having such a structure, before and after mounting the movable reflection member 7, it is necessary to adjust the positions of the optical fibers 10, 11, 12 and 13 and the position and the angle of the movable reflection member 7 in a trial-and-error manner thus making the assembling of the optical switch difficult.

DISCLOSURE OF THE INVENTION

The invention has been made in view of such circumstances and it is an object of the invention to enable the simple alignment of axes of an input optical path, an output optical path and a light reflection surface in an optical switch for changing over an input optical path and an output optical path.

The optical switch according to the invention is an optical switch including at least three input and output optical paths in total and performing the changeover of the optical paths by changing the combination of the input optical path and the output optical path which transmit light to each other, wherein a first region in which a front surface of a mirror member which is movable relative to the input optical path and the output optical path is allowed to face the input optical path and the output optical path thus forming a pair of light reflection surfaces which cross each other with a given angle, and a second region in which a plural pairs of light reflection surfaces are formed in a state that the neighboring light reflection surfaces cross each other with given angles, are arranged in front of the mirror member and along the moving direction of the mirror member.

Here, the input optical path is a light transmission medium which allows the light to perform the transmission propagation and irradiates light into a space and is, for example, constituted of an optical fiber or an optical waveguide. The output optical path is a light transmission medium which allows the light incident from the space to perform the transmission propagation and is, for example, constituted of an optical fiber or an optical waveguide.

According to the optical switch of the invention, for example, when both of the input optical path and the output optical path are provided in a plural number respectively, as in a case of embodiments of the invention, the lights which are radiated from some input optical paths among the plurality of input paths are incident on some output optical path among the plurality of output optical paths by being reflected on the light reflection surfaces formed in the first region and the lights which are radiated from another input optical paths are incident on another output optical path by being reflected on the light reflection surfaces formed in the first region, while the lights which are radiated from some input optical paths among the plurality of input optical paths are incident on another output optical path among the plurality of output optical paths by being reflected on the light reflection surfaces formed in the second region and lights which are radiated from another input optical paths are incident on some output optical path by being reflected on the light reflection surfaces formed in the second region. Due to such a constitution, by changing over the region where the lights are reflected by relatively moving the mirror member between the first region and the second region, it is possible to change over the coupling relationship of the input optical path and the output optical path. (Here, in the description of the embodiments, the optical switch of the invention does not exclude a case in which either one of the number of the input optical paths and the number of the output optical paths is set one and a case in which the number of the input optical paths and the number of the output optical paths are not equal).

Further, in this optical switch, the first region where the pair of light reflection surfaces are formed and the second region where the plural pairs of the light reflection surfaces are formed are integrally formed on the mirror member and hence, the positional displacement and the angular error between the light reflection surfaces of the first region and the light reflection surfaces of the second region depend on only the accuracy of parts (not influenced by assembling) whereby the positional displacement and the angular error are extremely small and stable. Accordingly, it is possible to easily perform the positional adjustment operation of the input optical path, the output optical path and the respective light reflection surfaces.

The optical switch according to another mode of the invention, the optical switch includes an actuator for moving the mirror member and hence, it is possible to change over the optical switch in response to an electric signal.

In the optical switch according to still another mode of the invention, portions of the input optical path and the output optical path which face the front surface of the mirror member are integrally formed with each other and hence, it is sufficient to perform only the adjustment of the whole input optical path and output optical path and the mirror member whereby it is possible to perform the positional adjustment operation more easily.

Further, the optical switch according to still another mode of the invention includes means which monitors which one of the first region and the second region among the front surface of the mirror member faces the input optical path and the output optical path and hence, it is possible to know the changeover state of the optical switch in response to an electric signal, for example, via the monitoring means.

In the optical switch according to still another mode of the invention, a spatial optical path length from a position where the light radiated from the input optical path is radiated from the input optical path to a position where the light is incident on the output optical path after being reflected on the light reflection surface in the first region is set equal to a spatial optical path length from a position where the light radiated from the input optical path is radiated from the input optical path to a position where the light is incident on the output optical path after being reflected on the light reflection surface in the second region.

Here, the spatial optical path length means an optically measured optical path length of the optical path through which the light propagates until the light which is radiated from the input optical path is incident on the output optical path. In general, when the first region and the second region are away from the input/output optical paths by the same distance, the spatial optical path length of the light which is reflected on the optical reflection region formed in the second region becomes shorter than the spatial optical path length of the light which is reflected on the optical reflection region formed in the first region and hence, to set both optical lengths equal, these regions may be arranged such that the second region is remoter from the input/output optical paths than the first region.

In the optical switch according to still another mode, the spatial optical path length of the light which is reflected on the first region and the spatial optical path length of the light which is reflected on the second region are set equal and hence, the adjustment of the positions of lenses which follow the changeover of the optical switch becomes no more necessary and, at the same time, the coupling efficiency of light is not changed.

Here, the above-explained constitutional features of the invention can be arbitrarily combined as much as possible.

BRIEF DESCRIPTION OF THE DRAWINGS

FIG. 1(a), (b) are a plan view and a cross-sectional view for explaining the structure of a main part of a conventional 2×2 type optical switch.

BEST MODE FOR CARRYING OUT THE INVENTION

Best modes for carrying out the invention are explained in detail in conjunction with the drawings.

FIRST EMBODIMENT

Figure 2A:
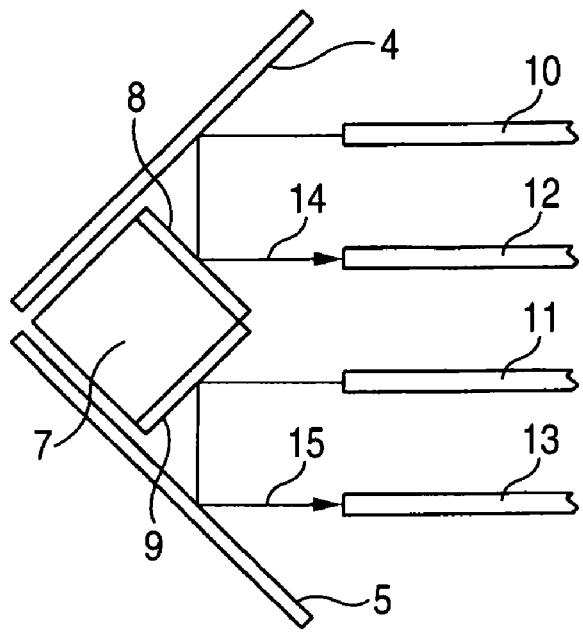
FIG. 2(a), (b) are views for explaining the changeover operation of the above-mentioned optical switch.
Figure 2B:
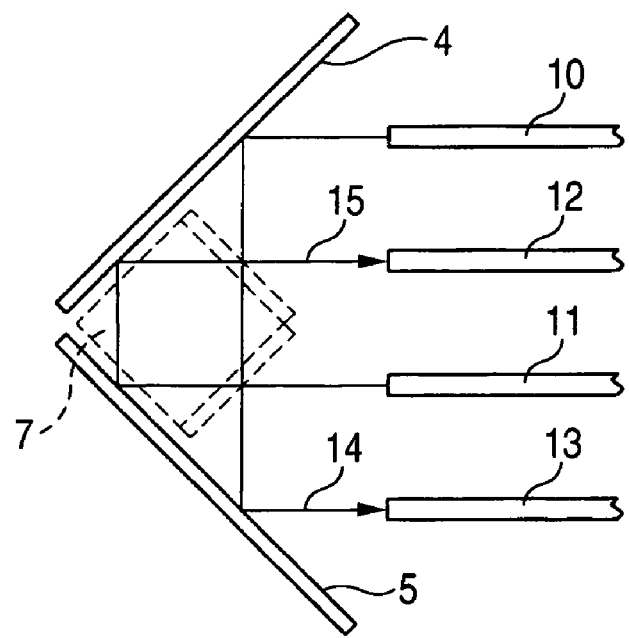
Figure 3:
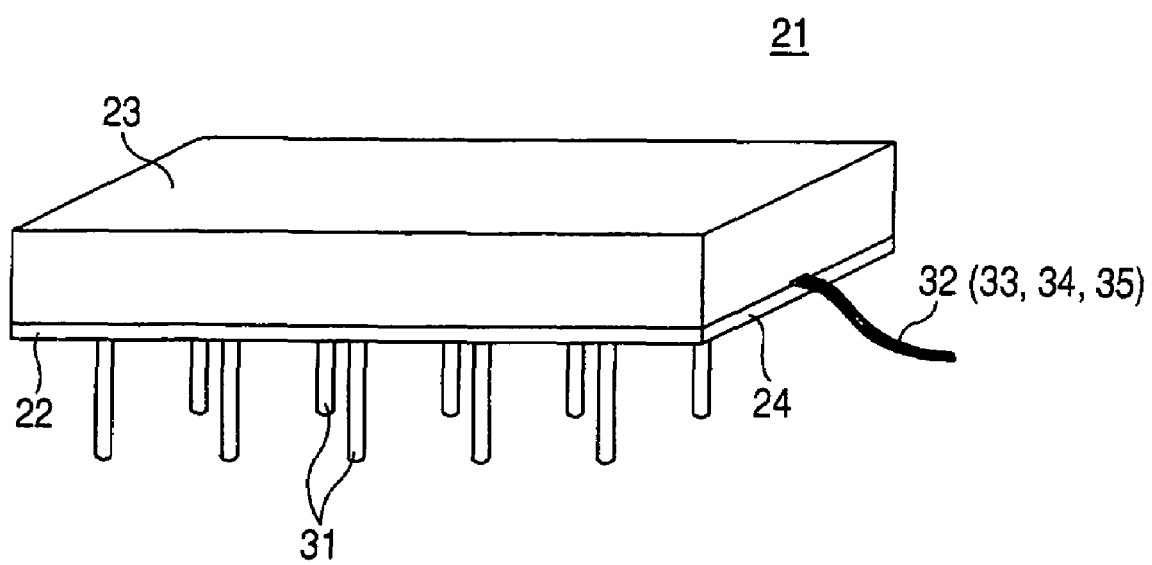
FIG. 3 is an appearance perspective view of an optical switch according to the first embodiment of the invention.
Figure 4:
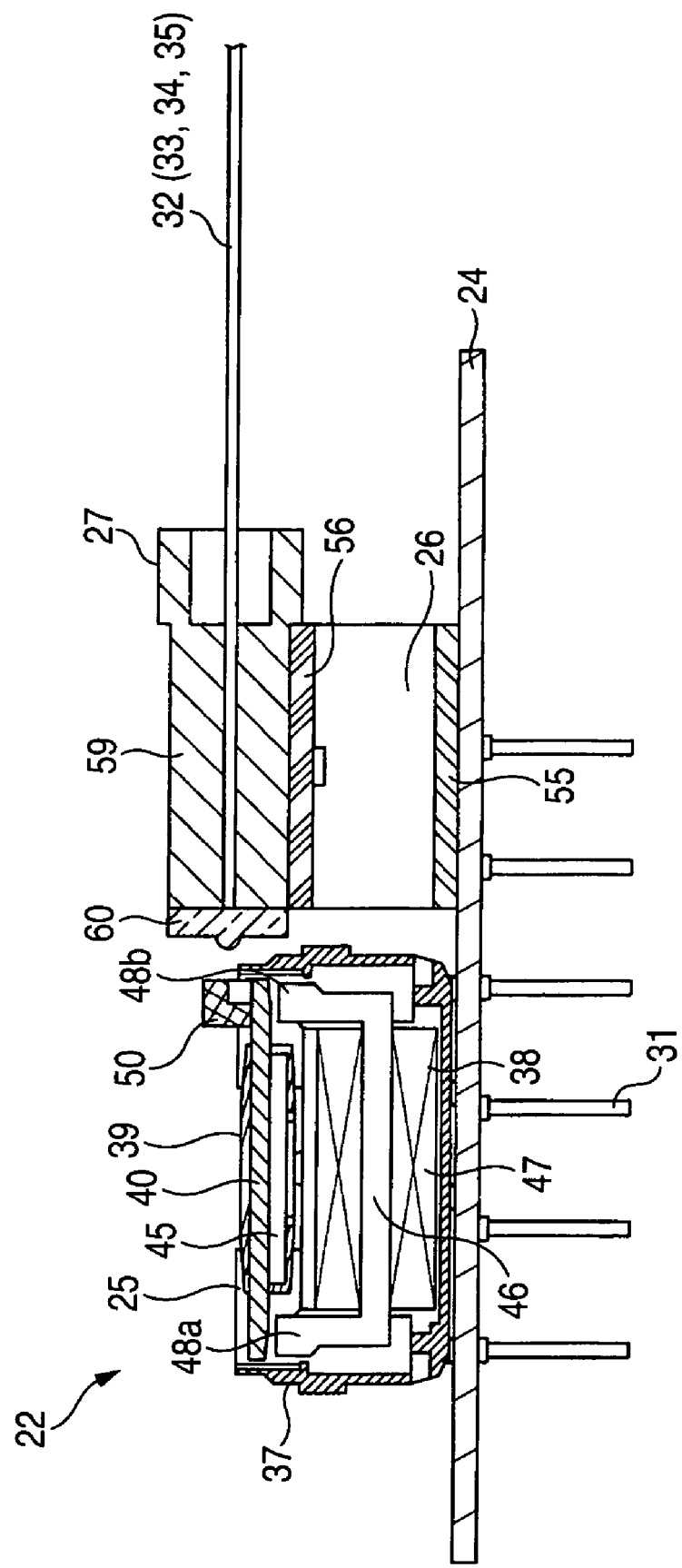
FIG. 4 is a schematic cross-sectional view of the above-mentioned optical switch (the illustration of a cover being omitted).
Figure 5:
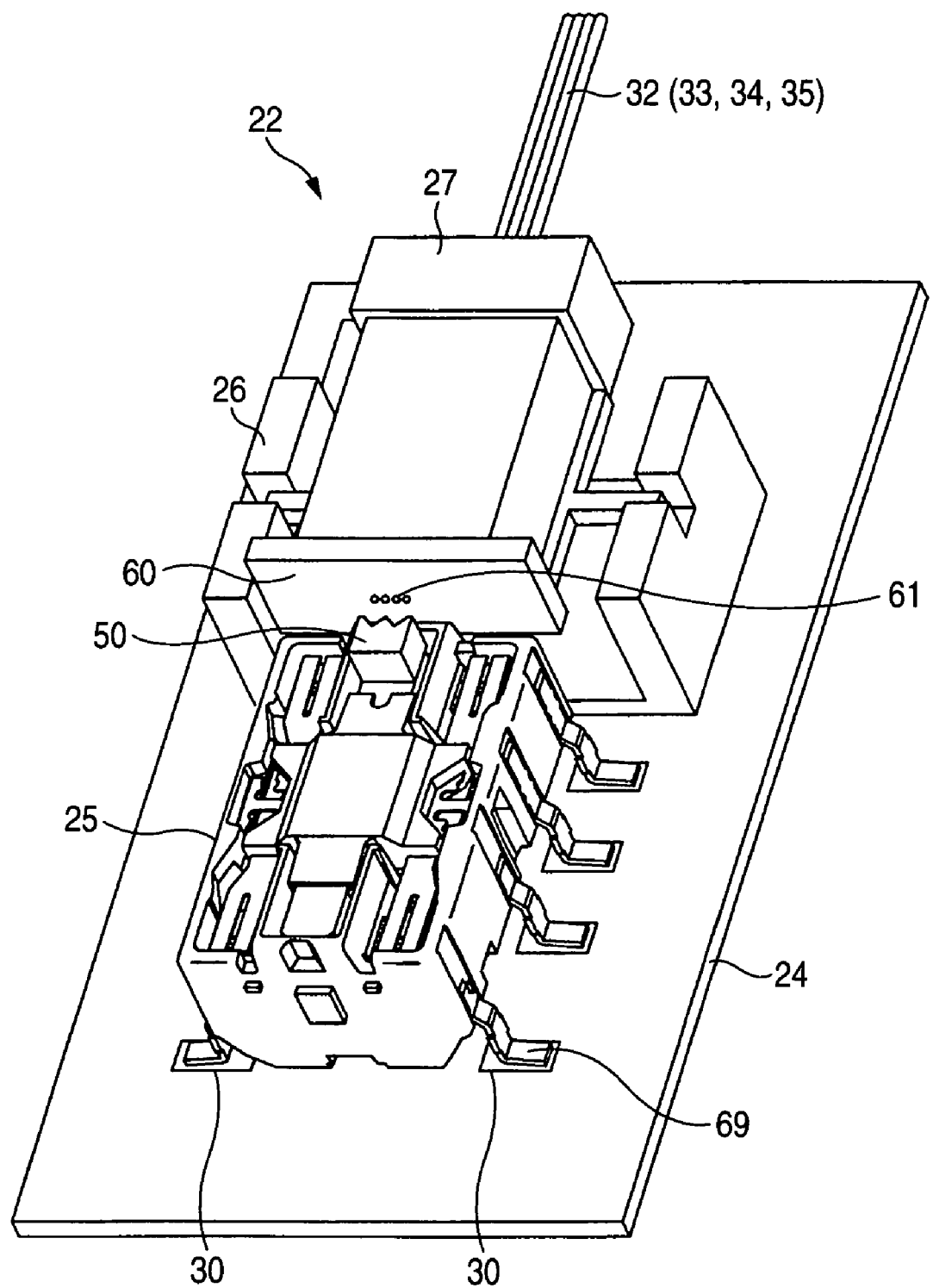
FIG. 5 is a perspective view showing the inner structure of the optical switch shown in FIG. 3.

FIG. 3 is an appearance perspective view of an optical switch according to the first embodiment of the invention, FIG. 4 is a schematic cross-sectional view of an essential part of the above-mentioned optical switch, and FIG. 5 is a perspective view showing the inner structure of the optical switch. This embodiment is directed to a 2×2 type optical switch which can change over the coupling relationship between two input optical fibers and two output optical fibers. The optical switch 21 is constituted of an optical switch body 22 and a cover 23 and the optical switch body 22 is formed as shown in FIG. 5. First of all, the constitutions of respective portions of the optical switch 21 are explained.

As shown in FIG. 5, the optical switch body 22 is constituted by forming a mirror unit 25, an optical fiber installation unit 26 and an optical fiber array 27 on a board 24. The mirror unit 25 is mounted on one side in the inside of the board 24, while the optical fiber array 27 is held by the optical fiber installation unit 26 which is fixed on another side in the inside of the board 24 and faces the mirror unit 25 in an opposed manner.

An electrode pad 30 for mounting the mirror unit 25 is formed on an upper surface of the board 24, while, as shown in FIG. 4, a lead leg 31 of the optical switch 21 is formed on a lower surface of the board 24. Here, the lead is not limited to a type which is inserted into a printed circuit board as in the case of the lead leg 31 shown in FIG. 4 and may be a surface mounting type lead.

Figure 6:
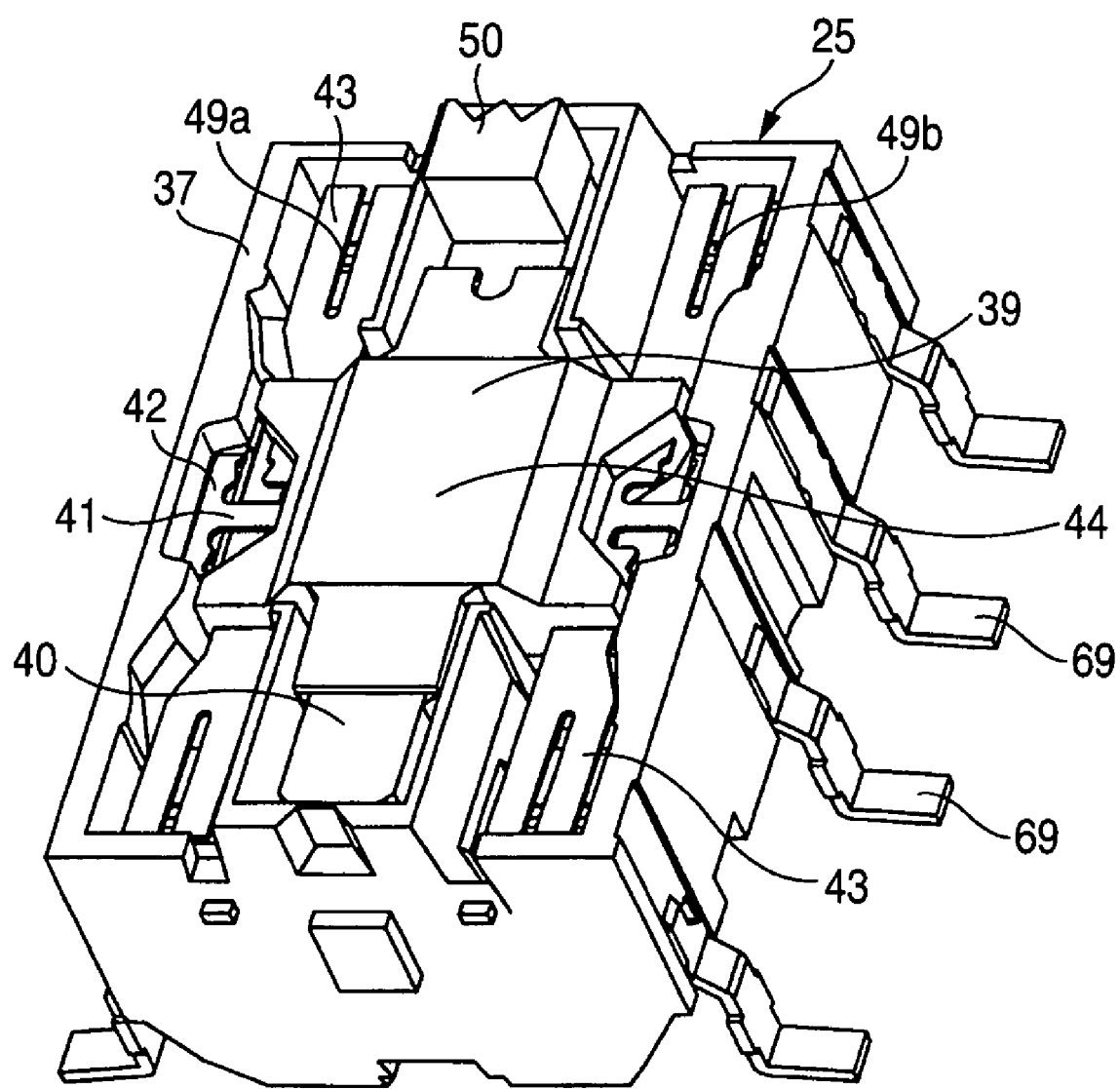
FIG. 6 is a perspective view showing the structure of a mirror unit.
Figure 7:
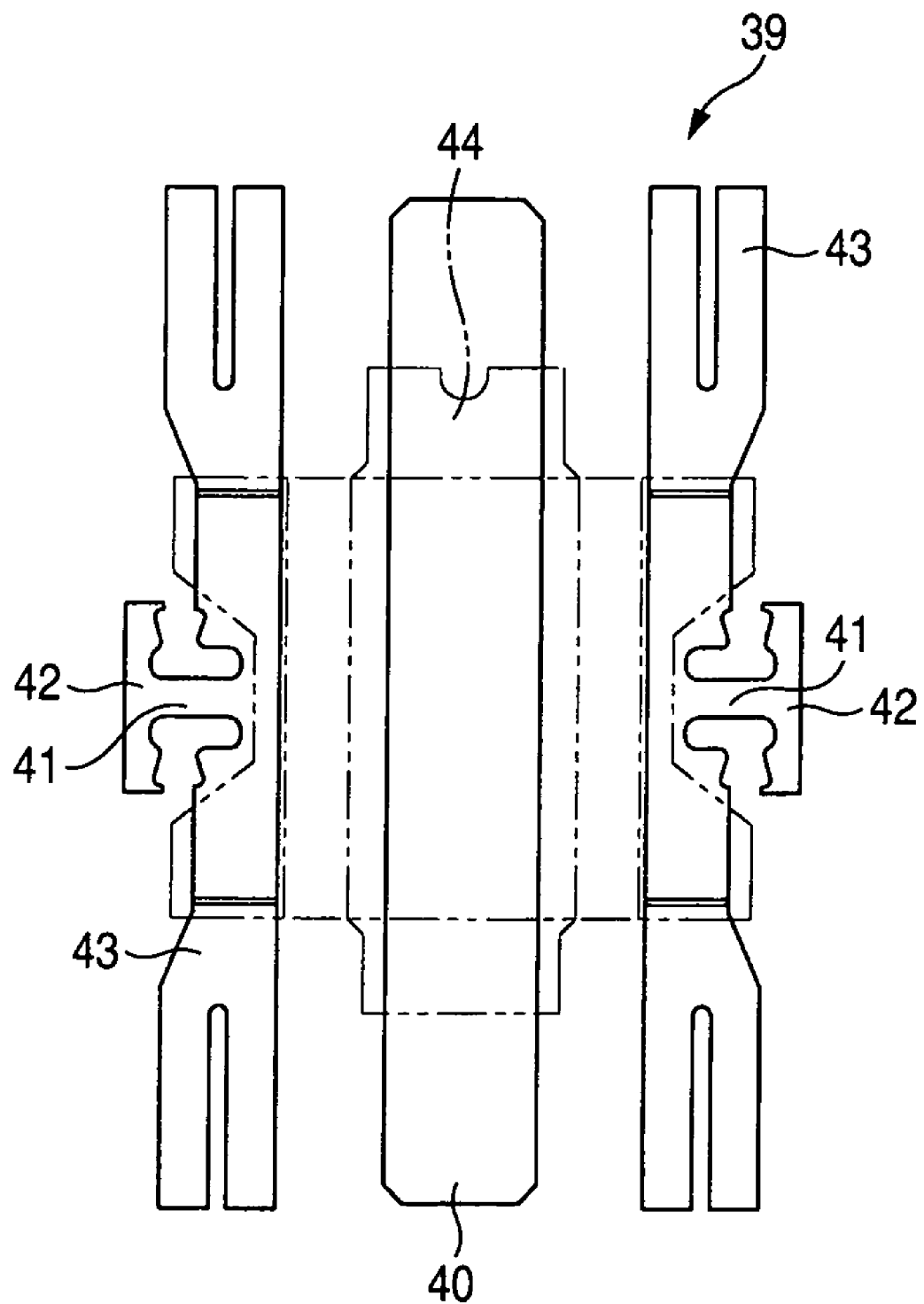
FIG. 7 is a plan view for explaining the structure of a driven part which is used in the above-mentioned mirror unit.

FIG. 6 is a perspective view showing the structure of the mirror unit 25. In this mirror unit 25, an electromagnet 38 is housed in the inside of a housing 37 which has an upper surface thereof open-ended (see FIG. 4), and a driven portion 39 is arranged above the electromagnet 38. FIG. 7 is a plan view with a portion thereof omitted showing the structure of the driven portion 39. The driven portion 39 is integrally formed by molding an iron piece 40 having a rectangular shape and a pair of metal-made spring pieces 43 which are arranged in parallel on both sides of the iron piece 40 using a resin mold portion 44, wherein both end portions of the iron piece 40 as well as both end portions of the spring pieces 43 are exposed from the resin mold portion 44. Further, twisted deformed shafts 41 are projected from outer central portions of the respective spring pieces 43 and fixing lugs 42 are formed on distal ends of the twisted deformed shafts 41. The twisted deformed shafts 41 and the fixing lugs 42 are also exposed from the resin mold portion 44. Further, as shown in FIG. 4, permanent magnets 45 are fixedly secured to lower-surface central portions of the iron pieces 40.

The driven portion 39 is arranged above the electromagnet 38 and has the fixing lugs 42 thereof fixed to an upper surface of the housing 37 and is tiltably supported by the twisted deformed shafts 41. Accordingly, the driven portion 39 is rotatable about the twisted deformed shafts 41 by twisting and deforming the twisted deformed shafts 41.

The electromagnet 38 is formed, as shown in FIG. 4, by winding coils 47 around an outer periphery of a core 46. The core 46 is formed of a permanent magnet. Both end portions of the core 46 extend upwardly (upwardly extending portions at both ends of the core 46 being referred to as yoke portions 48a, 48b) and face lower surfaces of both ends of the iron piece 40 in an opposed manner, wherein the yoke portions 48a, 48b are respectively magnetized to an S pole and an N pole. Further, since the permanent magnet 45 is bonded to a lower surface of the iron piece 40, the iron piece 40 is, as a whole, magnetized to the same pole (for example, when an S-pole surface of the permanent magnet 45 is bonded to the iron piece 40, the iron piece 40 assumes an S pole). Here, lead terminals 69 of the mirror unit 25 are formed on both side surfaces of the housing 37.

The manner of operation and the operation principle of the mirror unit 25 having such a structure are disclosed in Japanese Unexamined Patent Publication Hei10(1998)-255631. To briefly explain the manner of operation and the operation principle of the mirror unit 25, it is possible to rotate the driven portion 39 by the electromagnet 38 in different directions depending on the direction of a current which flows in the coil 47 and, furthermore, when either one of end portions of the iron piece 40 is attracted by either one of the yoke portions 48a, 48b, even when the supply of current to the coil 47 is turned off, the iron piece 40 maintains a state in which the iron piece 40 is attracted to either one of yoke portions 48a, 48b. That is, the iron piece 40 performs a latch operation in both directions and holds the switched state and hence, the power is not consumed.

When the driven portion 39 is driven by the electromagnet 38, the ends of the iron piece 40 are brought into contact with the yoke portions 48a, 48b and hence, the iron piece 40 is always stopped at a given angle. Further, when the iron piece 40 is inclined, the spring pieces 43 are also inclined correspondingly. Electrical contacts are formed on lower surfaces of both end portions of the spring pieces 43, while at positions which face the electrical contacts of the spring pieces 43 in an opposed manner, detection portions 49a, 49b (for example, electrical contacts) for detecting the contacting of the spring pieces 43 are provided respectively. By determining which one of the detection portions 49a, 49b outputs a detection signal, it is possible to monitor whether the mirror block 50 is elevated or lowered.

Figure 8:
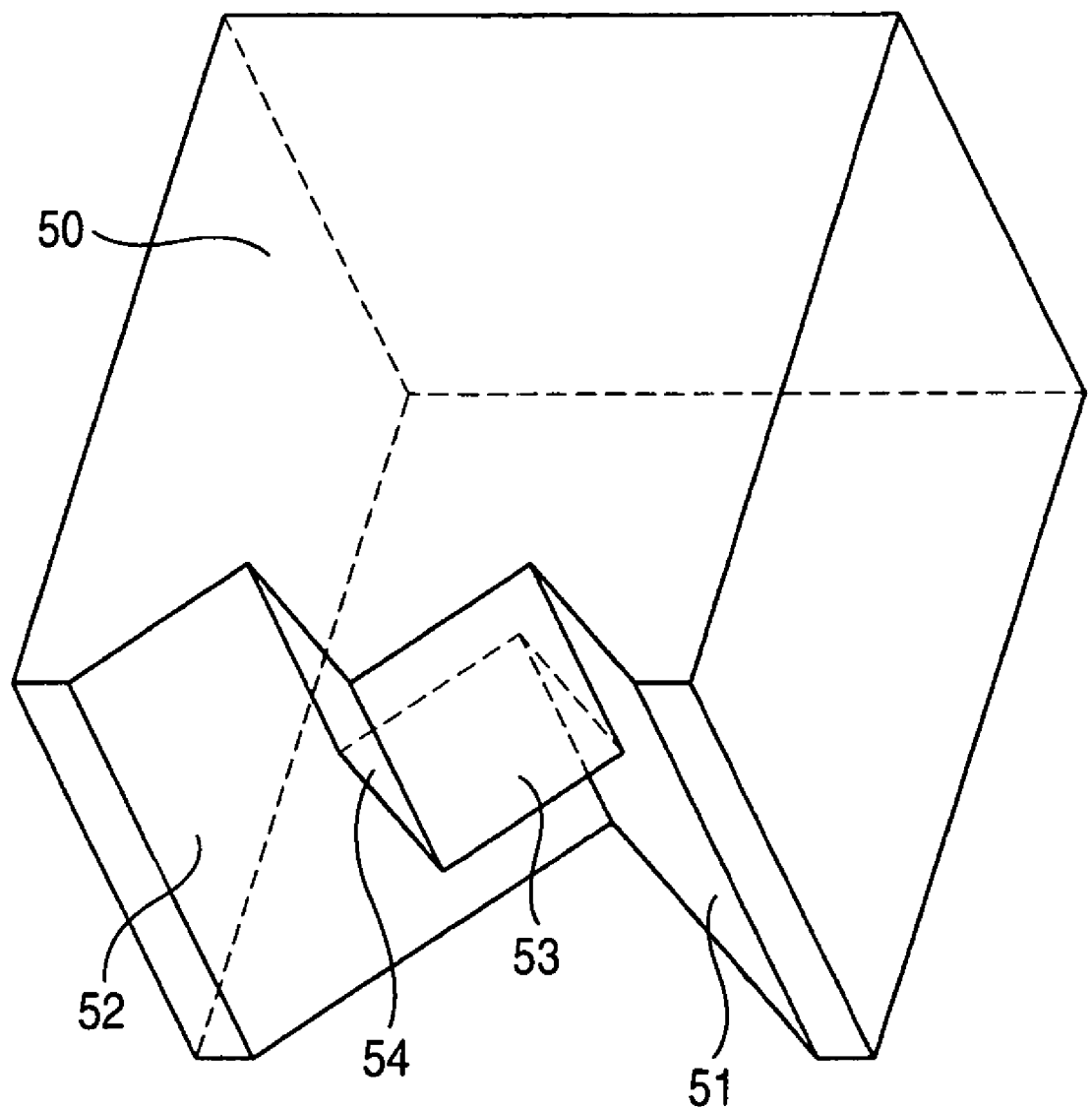
FIG. 8 is a perspective view showing a shape of the mirror block fixed to the driven part.
Figure 9A:
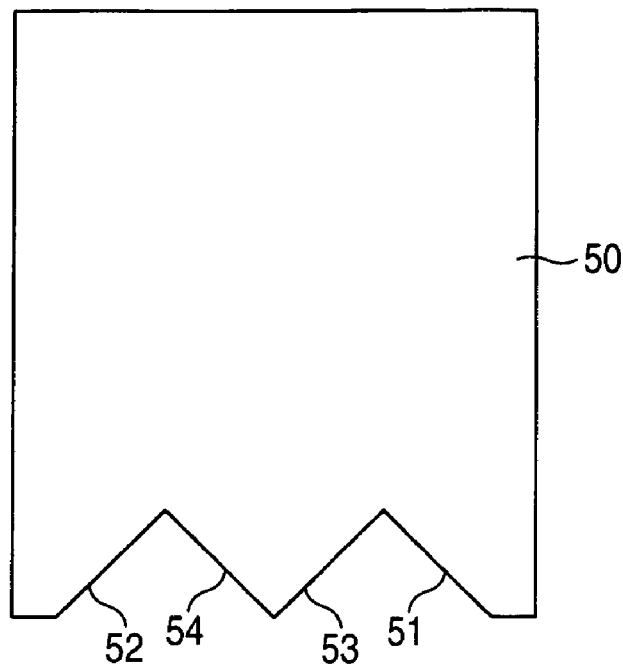
FIG. 9(a), (b) are a plan view and a front view of the above-mentioned mirror block.
Figure 9B:
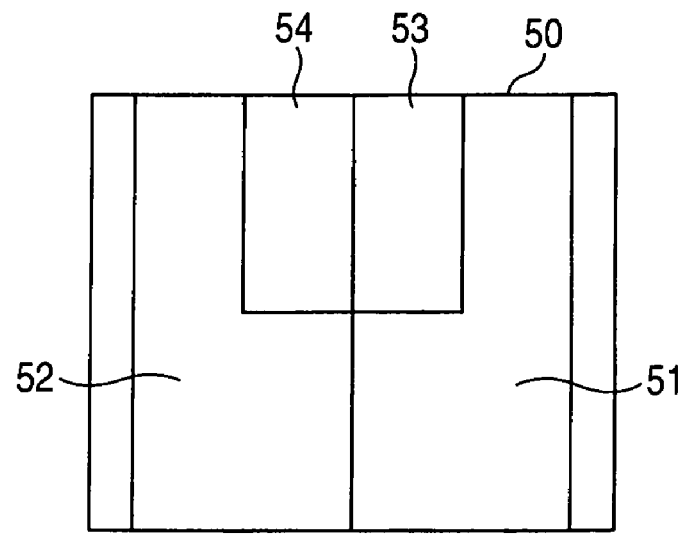

FIG. 8 is a perspective view showing a shape of the mirror block 50 which is fixed to the end portion of the iron piece 40, and FIG. 9(a), (b) are a plan view and a front view of the mirror block 50. The mirror block 50 is made of metal, glass, plastic or the like and is formed in a substantially rectangular parallelepiped shape. On a left side and a right side of a front surface of the mirror block 50, a first light reflection surface 51 and a second light reflection surface 52 are formed in a state that both reflection surfaces 51, 52 make an angle of 90 degree therebetween. Further, on a left side and a right side of an upper half portion of the front surface of the mirror block 50, a third light reflection surface 53 and a fourth light reflection surface 54 are formed in a projecting manner in a state that both reflection surfaces 53, 54 make an angle of 90 degree therebetween. Here, the third light reflection surface 53 and the first light reflection surface 51 also make an angle of 90 degree therebetween, while the fourth light reflection surface 54 and the second light reflection surface 52 also make an angle of 90 degree therebetween. Accordingly, on the upper half portion of the front surface of the mirror block 50, the first light reflection surface 51, the third light reflection surface 53, the second light reflection surface 52 and the fourth light reflection surface 54 are formed in a W-groove shape in a state that these reflection surfaces make an angle of 90 degrees from each other, while on the lower half portion of the front surface of the mirror block 50, the first light reflection surface 51 and the second light reflection surface 52 are formed in a V-groove shape in a state that these surfaces 51, 52 also make an angle of 90 degree therebetween. To be more specific, on the upper half portion of the mirror block 50, the first light reflection surface 51 as well as the third light reflection surface 53 and the second light reflection surface 52 as well as the fourth light reflection surface 54 are arranged in a face symmetry with respect to a center plane, while on the lower half portion of the mirror block 50, the first light reflection surface 51 and the second light reflection surface 52 are arranged in a face symmetry with respect to a center plane.

The mirror block 50 has a lower surface thereof fixed to an upper surface of an end portion of the iron piece 40 using an adhesive agent, wherein the light reflection surfaces 51, 52, 53 and 54 formed in a W-groove shape are arranged on the mirror block 50 and the light reflection surfaces 51, 52 formed in a V-groove shape are arranged below the mirror block 50. Opposite to such a structure, it may be possible to bond the iron piece 40 in a state that the upper surface of the mirror block 50 is directed downwardly so as to arrange the light reflection surfaces 51, 52 formed in a V-groove shape on the mirror block 50 and to arrange the light reflection surfaces 51, 52, 53 and 54 formed in a W-groove shape below the mirror block. However, in such a structure, at the time of performing the bonding operation of the mirror block 50, an adhesive agent rises from the V groove formed between the first light reflection surface 51 and the third light reflection surface 53 and the V groove formed between the fourth light reflection surface 54 and the second light reflection surface 52 due to a capillarity and is liable to easily smear the light reflection surfaces. In this embodiment, by adhering the mirror block 50 to the iron piece 40 with the lower surface of the mirror block 50 directed downwardly, the adhesive agent rises through only one V groove which is formed between the first light reflection surface 51 and the second light reflection surface 52 and hence, the light reflection surfaces are hardly smeared with the adhesive agent.

Figure 10:
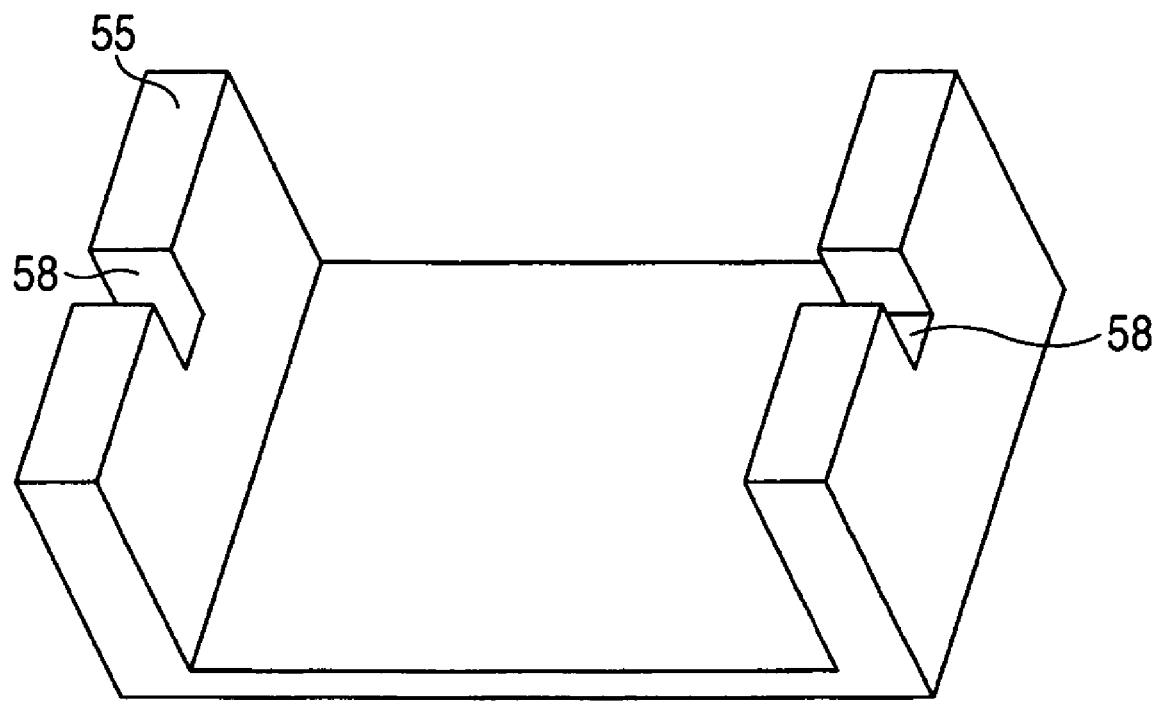
FIG. 10 is a perspective view of a support platform which constitutes an optical fiber installation set.
Figure 11:
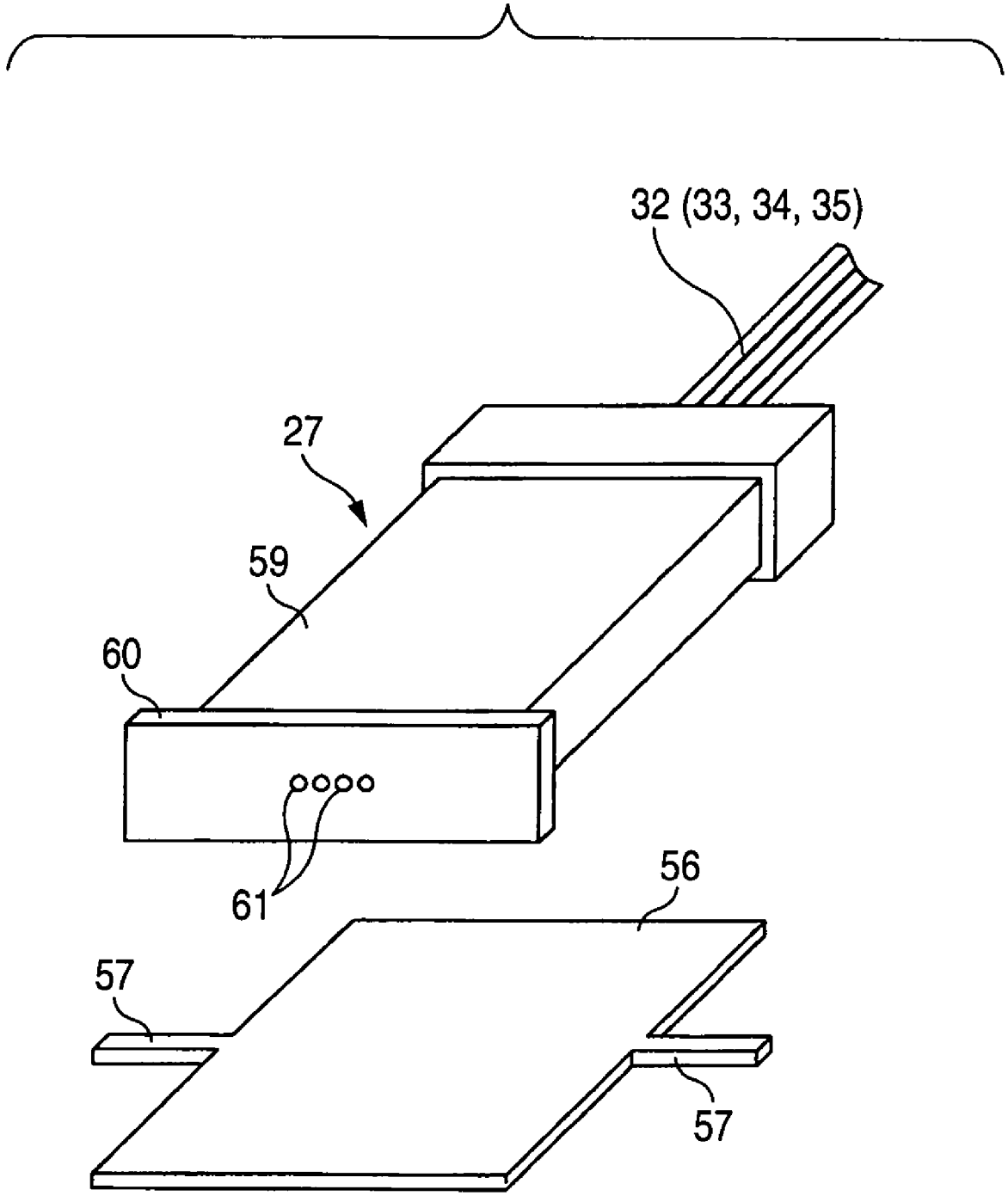
FIG. 11 is a perspective view showing an adjustment plate and an optical fiber array which constitute the optical fiber installation set.

The optical fiber installation unit 26 is constituted of a support base 55 which is formed in an approximately U shape shown in FIG. 10 and an adjustable plate 56 shown in FIG. 11. The support base 55 is provided with recessed portions 58 on upper surfaces of both side portions thereof and has a bottom surface thereof preliminarily fixed to an upper surface of the board 24. Rod-like arms 57 extend from both side surfaces of the adjustment plate 56. The adjustment plate 56 is fixed to a lower surface of an optical fiber array 27 using an adhesive agent before being mounted on the support base 55. Subsequently, the arms 57 of the adjustment plate 56 on which the optical fiber array 27 is mounted are accommodated in the recessed portions 58 of the support base 55, the position of the optical fiber array 27 is adjusted and, thereafter, the arms 57 are fixed to the inside of the recessed portions 58 using an adhesive agent, and the optical fiber array 27 is supported in the air by the adjustment plate 56.

Figure 12:
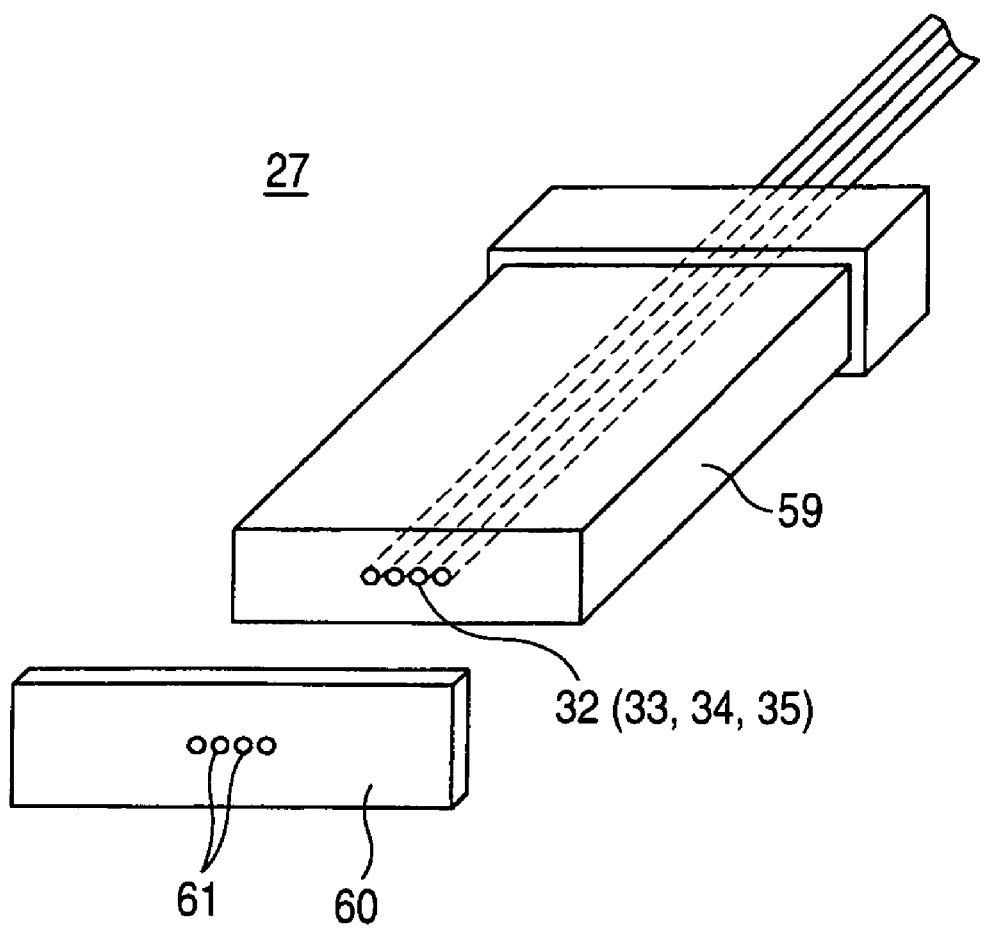
FIG. 12 is an exploded perspective view of the optical fiber array.

FIG. 12 is an exploded perspective view of the optical fiber array 27. In the optical fiber array 27, end portions of four optical fibers 32, 33, 34 and 35 are held in the inside of a holder 59. The distal end portions of the respective optical fibers 32, 33, 34 and 35 have axes thereof finely positioned in the inside of the holder 59 and are arranged in parallel to each other in a row with a given pitch, and are fixed in such a state. To be more specific, the first input optical fiber 32, the first output optical fiber 34, the second input optical fiber 33, and the second output optical fiber 35 are sequentially arranged. As means for finely positioning the optical fibers 32, 33, 34 and 35 in the holder 59, the optical fibers 32, 33, 34 and 35 may be fitted into a multi-core ferrule or the optical fibers 32, 33, 34 and 35 may be fitted into a V-shaped groove. Further, a lens array 60 is fixed to a front surface of the holder 59 using an adhesive agent or the like. On the lens array 60, minute coupling lenses 61 are formed in a state that the coupling lenses 61 face respective end surfaces of the optical fibers 32, 33, 34 and 35. As this lens array 60, the coupling lenses 61 made of transparent resin may be formed on a transparent resin board, or the coupling lenses 61 made of glass may be formed on a glass board, or the coupling lenses 61 made of glass may be formed on a transparent resin board, or the coupling lenses 61 made of transparent resin may be formed on a glass board. The lens array 60 is arranged in front of the holder 59 with an uncured adhesive agent therebetween and, thereafter, lights are radiated to the respective coupling lenses 61 from the respective optical fibers 32, 33, 34 and 35, and the lights which pass through the respective coupling lenses 61 are monitored thus aligning the optical axes of the optical fibers 32, 33, 34 and 35 and the axes of the coupling lenses 61, and the adhesive agent is cured in such a state so as to fix the lens array 60 to the front surface of the holder 59.

Next, the assembling step of the optical switch 21 is explained. In the assembling step of the optical switch 21, first of all, the mirror unit 25 is mounted on the board 24 by soldering the lead legs 69 of the mirror unit 25 to electrode pads 30 of the board 24. The mirror block 50 is preliminarily mounted on the mirror unit 25. The support base 55 of the optical fiber installation unit 26 is also arranged at a position which faces the mirror unit 25 in an opposed manner and is adhered to an upper surface of the board 24 preliminarily.

Next, as shown in FIG. 11, the adjustment plate 56 is adhered to the lower surface of the optical fiber array 27 so as to integrate the optical fiber array 27 and the adjustment plate 56. The optical fiber array 27 is gripped by a robot hand and is transported to a position above the support base 55 and arms 57 of the adjustment plate 56 which are fixed to the lower surface of the optical fiber array 27 are accommodated in the inside of the recessed portions 58 formed in the support base 55.

Thereafter, the mirror block 50 is elevated so as to make the first light reflection surface 51 and the second light reflection surface 52 face the optical fibers 32, 33, 34 and 35 in an opposed manner. In such a state, the optical fiber array 27 is moved to perform the adjustment of the optical axis positions (see FIG. 13(b)) and the position of the optical fiber array 27 is stored in the computer. Next, the mirror block 50 is lowered to make the first light reflection surface 51, the third light reflection surface 53, the fourth light reflection surface 54 and the second light reflection surface 52 face the optical fibers 32, 33, 34 and 35 in an opposed manner. In such a state, the optical fiber array 27 is moved to perform the adjustment of optical axes positions (see FIG. 13(a)), and the position of the optical fiber array 27 is stored in the computer. In this manner, by detecting the optical axes adjustment positions of the optical fiber array 27 in the state that the mirror block 50 is elevated and in the state that the mirror block 50 is lowered and by making the computer store the respective positions, the computer calculates an optimum position based on the data (for example, an average position of both positions being obtained). When the optimum position of the optical fiber array 27 is calculated by the computer, the optical fiber array 27 is finely adjusted by the robot hand to assume the optimum position and is held in such a state. While holding this state, an ultraviolet ray curing type adhesive agent is dropped between the arms 57 and the recessed portions 58 and the ultraviolet ray curing type adhesive agent is cured by radiating ultraviolet rays to the ultraviolet ray curing type adhesive agent thus fixing the arms 57 in the inside of the recessed portions 58 using an adhesive agent whereby the optical fiber array 27 is eventually fixed to the final adjustment position. Here, provided that a fast curing type adhesive agent is used as the adhesive agent which serves to fix the arms 57, the adhesive agent is not limited to the ultraviolet ray curing type adhesive agent. Further, the arms 57 may be fixed using soldering or the like in place of the adhesive agent.

By mounting the mirror unit 25 and the optical fiber installation unit 26 in the inside of the board 24, the optical switch body 22 is assembled. In this optical switch body 22, the mirror block 50 of the mirror unit 25 and the end surfaces of the respective optical fibers 32, 33, 34 and 35 of the optical fiber array 27 face each other, and when the electromagnet 38 of the mirror unit 25 is energized and an end portion of the iron piece 40 on a side opposite to a side on which the mirror block 50 is formed is attracted, the mirror block 50 is elevated. In this state, the third light reflection surface 53 and the fourth light reflection surface 54 are elevated higher than a plane which includes the axes of end portions of the optical fibers 32, 33, 34 and 35. Accordingly, as shown in FIG. 13(b), in the lower half portion of the mirror block 50, the first input optical fiber 32 and the first output optical fiber 34 face the first light reflection surface 51 and the second input optical fiber 33 and the second output optical fiber 35 face the second light reflection surface 52. Further, when the electromagnet 38 of the mirror unit 25 is energized and an end portion on the side on which the mirror block 50 of the iron piece 40 is formed is attracted, the mirror block 50 is lowered downwardly. In this state, as show in FIG. 13(a), in the upper half portion of the mirror block 50, the first input optical fiber 32 faces the first light reflection surface 51 in an opposed manner and the first output optical fiber 34 faces the third light reflection surface 53 in an opposed manner, the second input optical fiber 33 faces the fourth light reflection surface 54 in an opposed manner, and the second output optical fiber 35 faces the second light reflection surface 52 in an opposed manner.

Figure 13A:
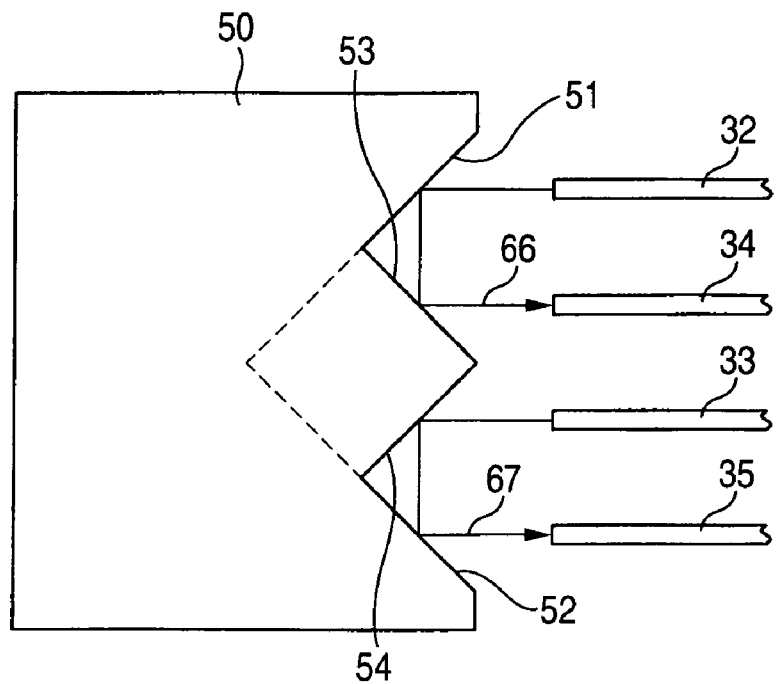
FIG. 13(a), (b) are operational explanatory views of the optical switch according to the invention.
Figure 13B:
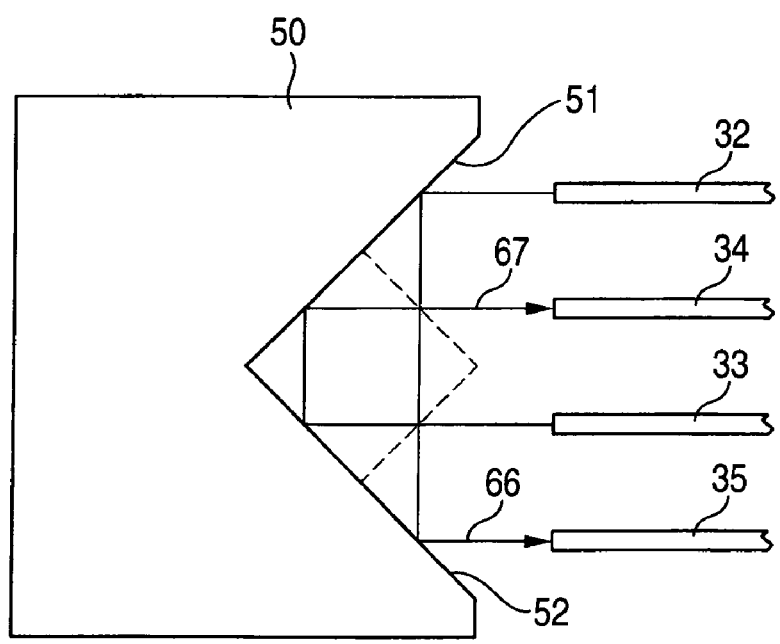

Here, assuming that the positional relationship between the respective optical fibers 32, 33, 34 and 35 and the respective light reflection surfaces 51, 52, 53 and 54 is accurately adjusted, with respect to the optical switch 21 in the changeover state in which the mirror block 50 is lowered as shown in FIG. 13(a), a light 66 which is radiated from the first input optical fiber 32 is reflected on the first light reflection surface 51 and the third light reflection surface 53 and, thereafter, is incident on the first output optical fiber 34. Further, alight 67 which is radiated from the second input optical fiber 33 is reflected on the fourth light reflection surface 54 and the second light reflection surface 52 and, thereafter, is incident on the second output optical fiber 35. Accordingly, in such a changeover state, the first input optical fiber 32 and the first output optical fiber 34 are coupled, while the second input optical fiber 33 and the second output optical fiber 35 are coupled.

To the contrary, with respect to the optical switch 21 in the changeover state in which the mirror block 50 is elevated as shown in FIG. 13(b), the light 66 which is radiated from the first input optical fiber 32 is reflected on the first light reflection surface 51 and the second light reflection surface 52 and, thereafter, is incident on the second output optical fiber 35. Further, the light 67 which is radiated from the second input optical fiber 33 is reflected on the second light reflection surface 52 and the first light reflection surface 51 and, thereafter, is incident on the first output optical fiber 34. Accordingly, in such a changeover state, the first input optical fiber 32 and the second output optical fiber 35 are coupled, while the second input optical fiber 33 and the first output optical fiber 34 are coupled.

Figure 14:
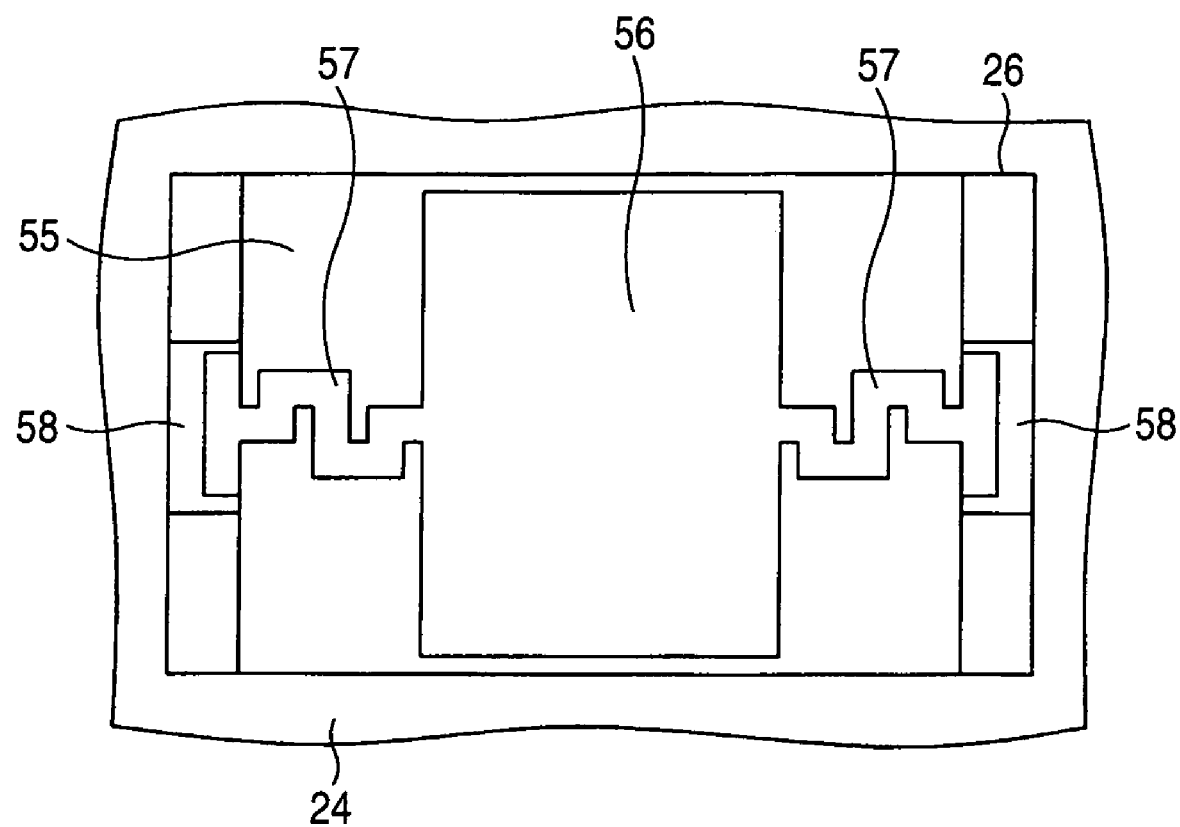
FIG. 14 is a plan view showing another example of the optical fiber installation unit.

Here, even when the positions of the mirror block 50 and the optical fiber array 27 are finely adjusted, there may arise a case in which the arms 57 are moved until the adhesive agent is completely cured and hence, the positional adjustment is again required after mounting the optical fiber array 27. To cope with such a case, as shown in FIG. 14, the arms 57 are formed in a bent shape or in a zigzag shape and hence, even after the adjustment plate 56 is fixed to the support base 55, the arms 57 are plastically deformed thus moving the optical fiber array 27 together with the adjustment plate 56 so as to perform the positional adjustment of the optical fiber array 27 in the longitudinal direction as well as in the lateral direction. Alternatively, an angle of the optical fiber array 27 may be adjusted.

When the positional adjustment of the optical fiber array 27 is completed, the upper surface of the optical switch body 22 is covered with a cover 23 so as to seal an upper surface of the optical switch body 22. Due to such a constitution, it is possible to manufacture the optical switch 21 having the sealing structure.

SECOND EMBODIMENT

Figure 15A:
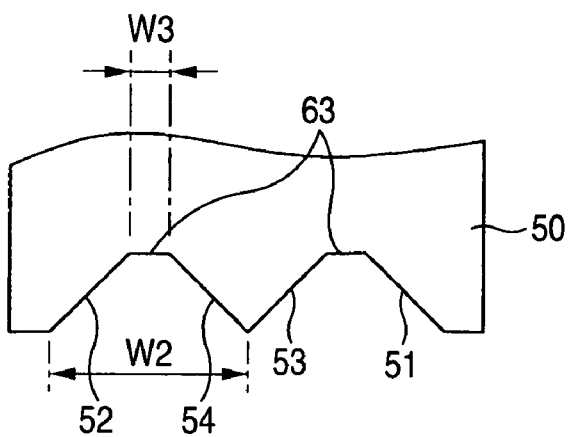
FIGS. 15(a), (b) and (c) are a plan view, a front view and a lower surface view with a part broken away showing the mirror block used in the second embodiment of the invention.
Figure 15B:
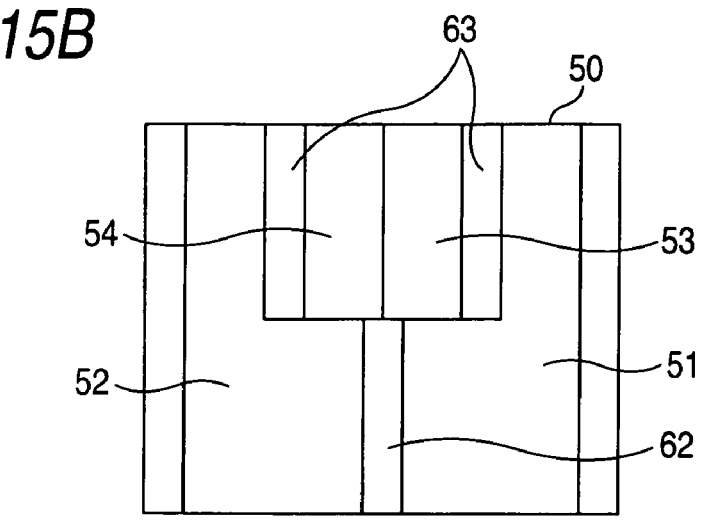
Figure 15C:
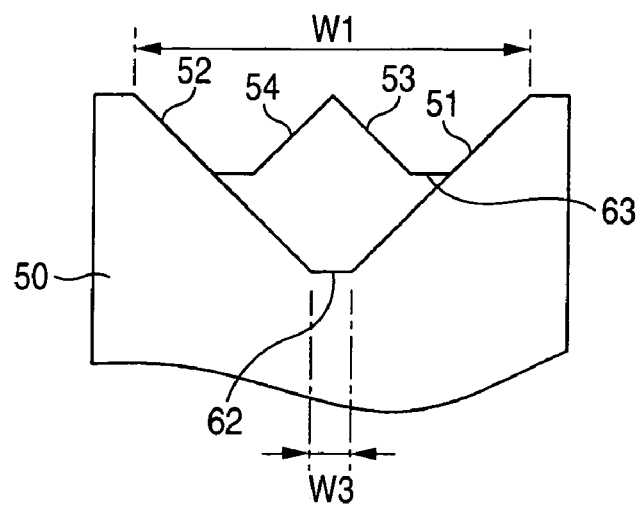

FIGS. 15(a), (b) and (c) are a plan view, a front view and a lower plan view with a part broken away showing the structure of a mirror block 50 used in the optical switch according to the second embodiment of the invention. In the first mirror block 50, with respect to a V groove formed between the first light reflection surface 51 and the second light reflection surface 52, a V groove formed between the first light reflection surface 51 and the third light reflection surface 53, and a V groove formed between the fourth light reflection surface 54 and the second light reflection surface 52, by embedding the deepest portions of the respective V grooves, flat surface portions 62, 63, 63 are formed thus making the suction of the adhesive agent even at the deep portions of the V grooves due to the capillarity difficult at the time of adhering the mirror block 50. Although the deep portions of the V grooves are made flat in the drawing, there is no problem in forming the portions of the V grooves into a curved surface. In this manner, by setting a lower limit value with respect to a groove width at the deep portions of the V grooves, it is possible to make the suction of the adhesive agent to the light reflection surfaces difficult and hence, the light reflection surfaces are further hardly smeared with the adhesive agent.

Here, in this embodiment, an opening width W1 of the V groove formed between the first light reflection surface 51 and the second light reflection surface 52 is set to 1 mm, respective opening widths W2 of the V groove formed between the first light reflection surface 51 and the third light reflection surface 53 and the V groove formed between the fourth light reflection surface 54 and the second light reflection surface 52 are set to 0.5 mm, and a width W3 of the flat surface portions 62, 63 of the deep portions of the V grooves is set to substantially 50 µm.

THIRD EMBODIMENT

In the mirror unit 25 having the above-mentioned structure, since the mirror block 50 is elevated or lowered by rotating the iron piece 40 like a seesaw, an angle of the front surface (light reflection surface) of the mirror block 50 is changed vertically between when the mirror block 50 is elevated and when the mirror block 50 is lowered. Particularly, when the mirror unit 25 is miniaturized, the change of the angle when the mirror block 50 is elevated or lowered is increased and hence, there exists a possibility that the lights which are radiated from the input optical fibers 32, 33 and are reflected on the mirror block 50 are deviated from the output optical fibers 34, 35. In such a case, the mirror block 50 having the structure shown in FIG. 16 and FIG. 17(a), (b), (c) may be used.

Figure 16:
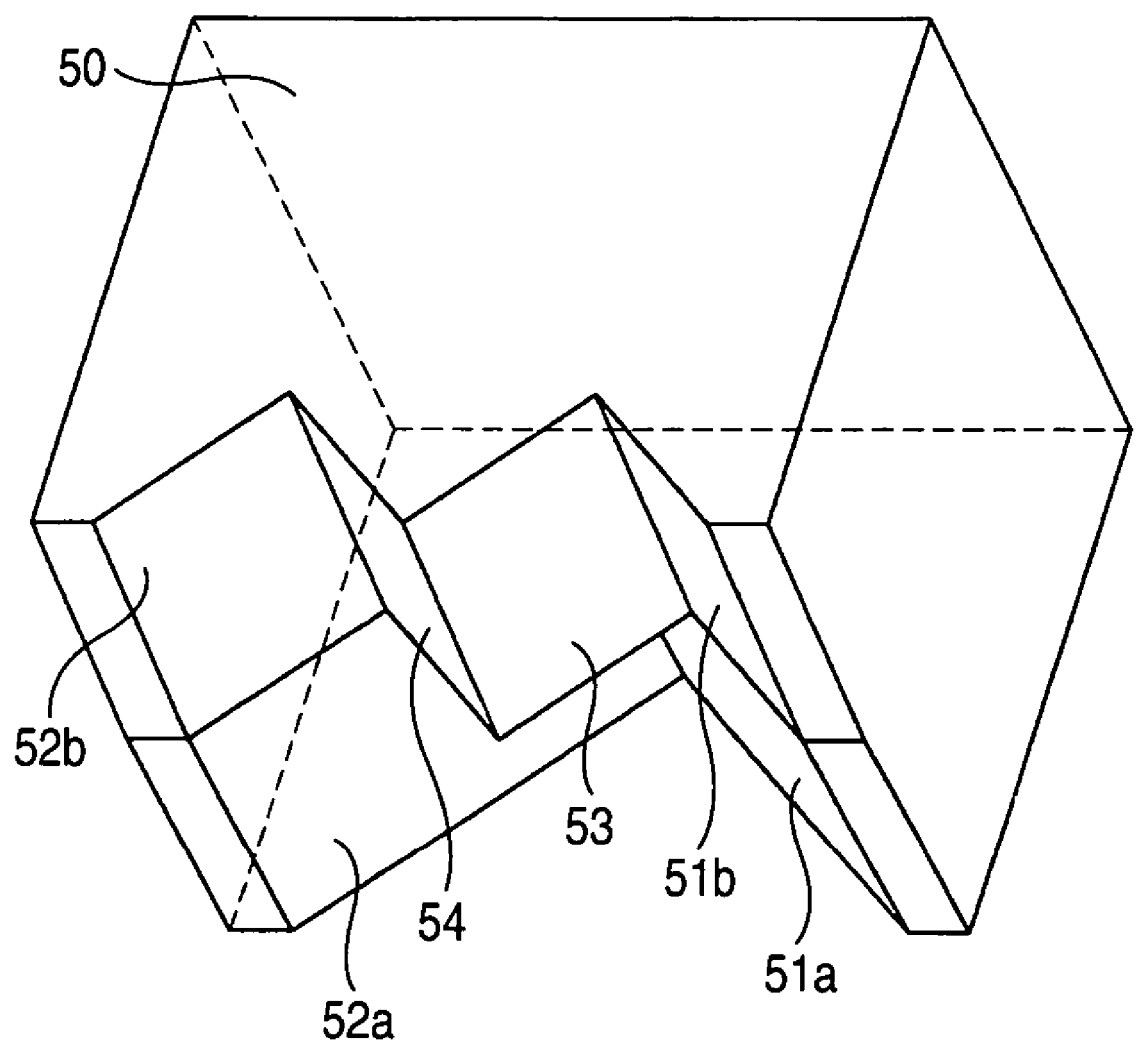
FIG. 16 is a perspective view of the mirror block used in the third embodiment of the invention.
Figure 17A:
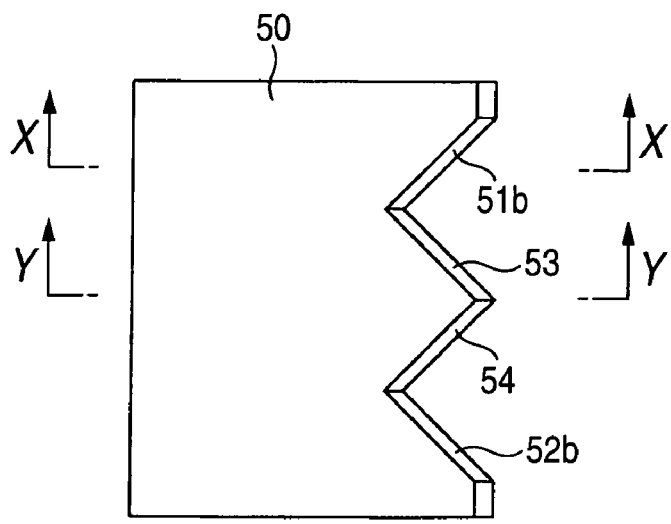
FIG. 17(a) is a plan view of the above-mentioned mirror block.
Figure 17B:
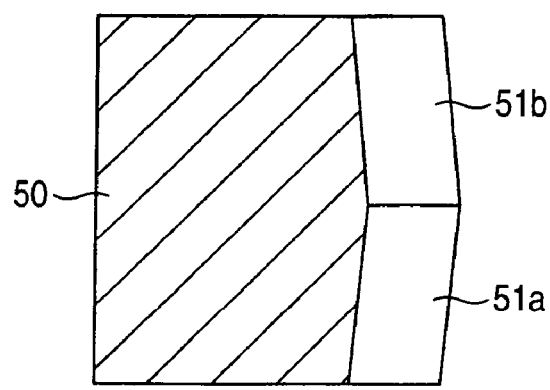
FIG. 17(b) is a cross-sectional view taken along a line X—X in FIG. 17(a)
Figure 17C:
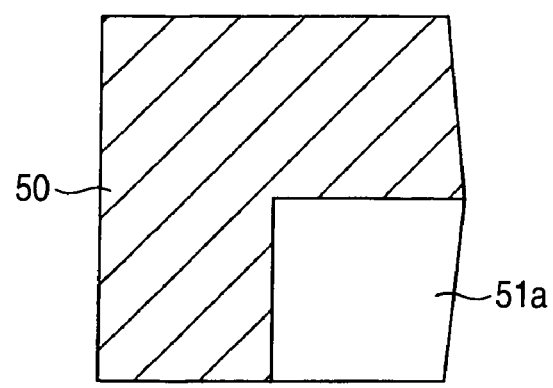
FIG. 17(c) is a cross-sectional view taken along a line Y—Y in FIG. 17(a).

FIG. 16 is a perspective view showing the structure of the mirror block 50 used in the optical switch according to the third embodiment of the invention. FIG. 17(a) is a plan view of the mirror block 50 and FIG. 17(b), (c) are respectively a cross-sectional view taken along a line X—X in FIG. 17(a) and a cross-sectional view taken along a line Y—Y in FIG. 17(a). With respect to this mirror block 50, a lower half of the front surface of the mirror block 50 is formed in a V-groove shape by a first light reflection surface 51a and a second light reflection surface 52a and, at the same time, the first light reflection surface 51a and the second light reflection surface 52a are inclined downwardly such that normal lines which are erected from the first light reflection surface 51a and the second light reflection surface 52 are included in the same plane as optical axes of distal ends of the optical fibers 32, 33, 34 and 35 when a mirror block 50 mounted on a mirror unit 25 is elevated. Further, an upper half of the front surface of the mirror block 50 is formed into a W-groove shape due to a first light reflection surface 51b, a second light reflection surface 52b, a third light reflection surface 53, and a fourth light reflection surface 54 and, at the same time, the first light reflection surface 51b, the second light reflection surface 52b, the third light reflection surface 53, and the fourth light reflection surface 54 are inclined upwardly such that normal lines which are erected from the first light reflection surface 51b, the second light reflection surface 52b, the third light reflection surface 53, and the fourth light reflection surface 54 are included in the same plane as the optical axes of distal ends of the optical fibers 32, 33, 34 and 35 when the mirror block 50 mounted on the mirror unit 25 is lowered.

Accordingly, using such a mirror block 50, there is no possibility that the lights reflected on the mirror block 50 are deviated from the plane which includes the optical axes of the optical fibers 32, 33, 34 and 35 whereby the alignment of the axes of the respective first light reflection surfaces 51a, 51b, 52a, 52b, 53 and 54 and the axes of the respective optical fibers 32, 33, 34 and 35 can be easily performed and, at the same time, the coupling efficiency of the optical switch 21 can be enhanced.

FOURTH EMBODIMENT

The embodiment shown in FIG. 18 is directed to a 1×2 type optical switch which includes one input optical fiber and two output optical fibers. In this embodiment, when a mirror block 50 is lowered, a first output optical fiber 34 faces a third light reflection surface 53 in an opposed manner, an input optical fiber 64 faces a fourth light reflection surface 54 in an opposed manner, and a second output optical fiber 35 faces a second light reflection surface 52 in an opposed manner.

Figure 18A:
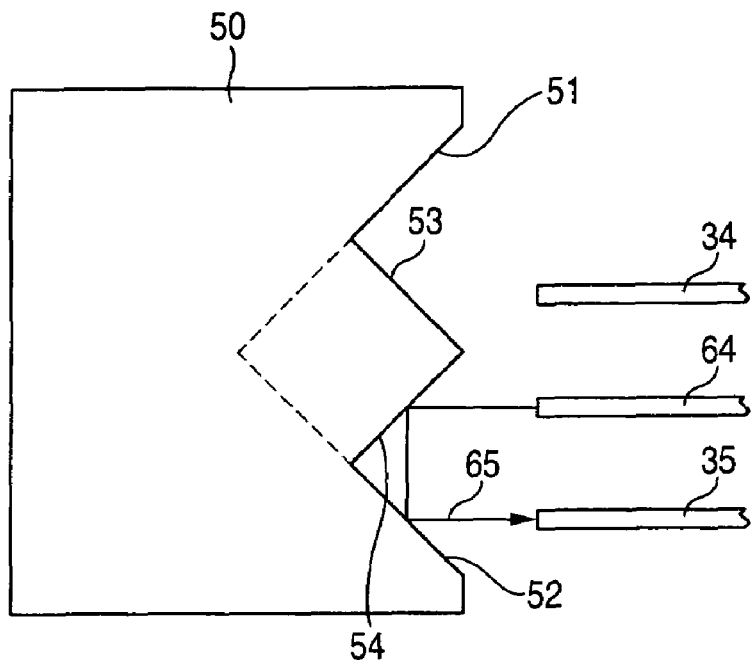
FIG. 18(a), (b) are schematic views for explaining the operation of a 1×2 type optical switch which constitutes a fourth embodiment of the invention.

Here, in the optical switch having such a constitution, in a changeover state in which the mirror block 50 is lowered, as shown in FIG. 18(a), a light 65 which is radiated from an input optical fiber 64 is reflected on a fourth light reflection surface 54 and a second light reflection surface 52 and, thereafter, is incident on a second output optical fiber 35. Accordingly, in this changeover state, the input optical fiber 64 and the second output optical fiber 35 are coupled to each other.

Figure 18B:
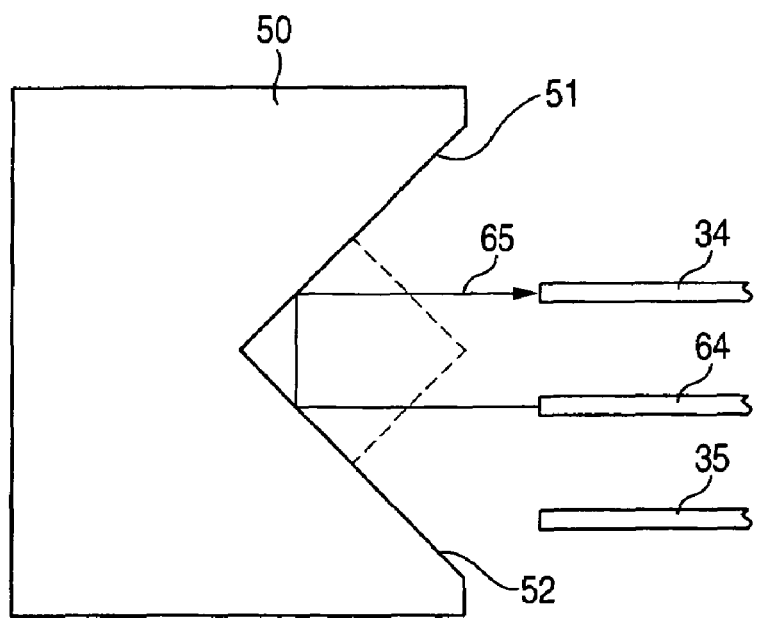

On the other hand, in a changeover state in which the mirror block 50 is elevated, as shown in FIG. 18(b), a light 65 which is radiated from an input optical fiber 64 is reflected on a second light reflection surface 52 and a first light reflection surface 51 and, thereafter, is incident on a first output optical fiber 34. Accordingly, in this changeover state, the input optical fiber 64 and the first output optical fiber 34 are coupled to each other.

Here, it is possible to apply this embodiment to a 1×2 type optical switch which includes two input optical fibers and one output optical fiber.

FIFTH EMBODIMENT

Figure 19A:
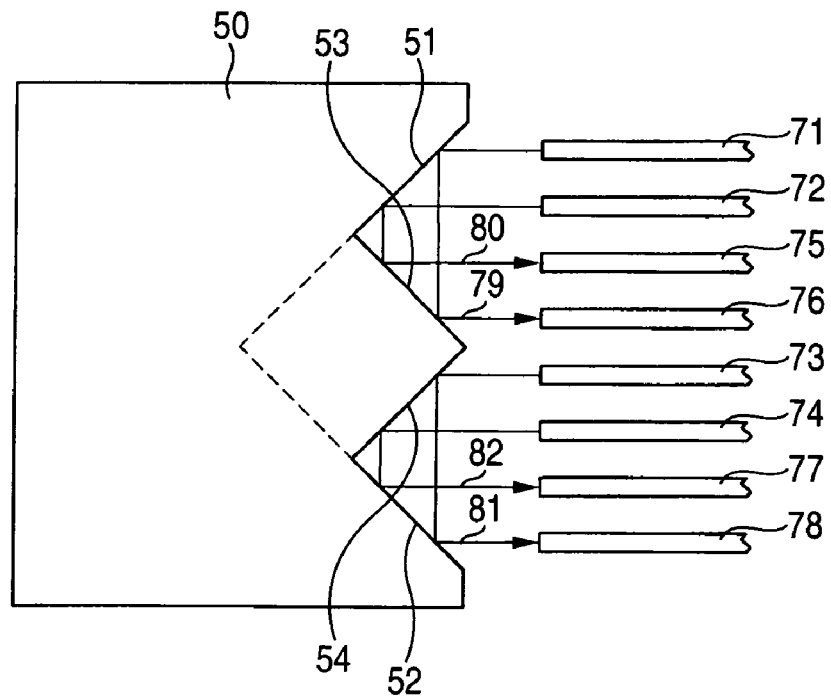
FIG. 19(a), (b) are schematic views for explaining the operation of a 4×4 type optical switch which constitutes a fifth embodiment of the invention.

The embodiment shown in FIG. 19 is directed to a 4×4 type optical switch which includes four input optical fibers and four output optical fibers. In this optical switch, when a mirror block 50 is lowered, a first input optical fiber 71 and a second input optical fiber 72 are arranged to face a first light reflection surface 51 in an opposed manner, a first output optical fiber 75 and a second output optical fiber 76 are arranged to face a third light reflection surface 53 in an opposed manner, a third input optical fiber 73 and a fourth input optical fiber 74 are arranged to face a fourth light reflection surface 54 in an opposed manner, and a third output optical fiber 77 and a fourth output optical fiber 78 are arranged to face a second light reflection surface 52 in an opposed manner.

Here, in a changeover state in which the mirror block 50 is lowered, lights 79,80 which are radiated from the first input optical fiber 71 and the second input optical fiber 72 are reflected on the first light reflection surface 51 and the third light reflection surface 53 and, thereafter, are respectively incident on the second output optical fiber 76 and the first output optical fiber 75. Further, lights 81,82 which are radiated from the third input optical fiber 73 and the fourth input optical fiber 74 are reflected on the fourth light reflection surface 54 and the second light reflection surface 52 and, thereafter, are respectively incident on the fourth output optical fiber 78 and the third output optical fiber 77. Accordingly, in this changeover state, the first input optical fiber 71 and the second output optical fiber 76 are coupled to each other, the second input optical fiber 72 and the first output optical fiber 75 are coupled to each other, the third input optical fiber 73 and the fourth output optical fiber 78 are coupled to each other, and the fourth input optical fiber 74 and the third output optical fiber 77 are coupled to each other.

Figure 19B:
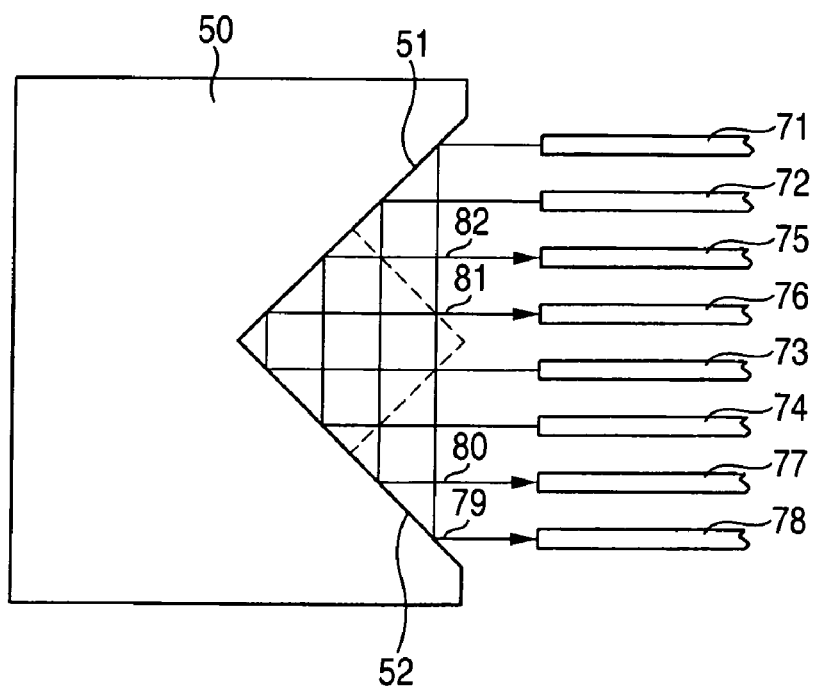

On the other hand, in a changeover state in which the mirror block 50 is elevated, as shown in FIG. 19(b), lights 79,80 which are radiated from the first input optical fiber 71 and the second input optical fiber 72 are reflected on the first light reflection surface 51 and the second light reflection surface 52 and, thereafter, are respectively incident on the fourth output optical fiber 78 and the third output optical fiber 77. Further, lights 81,82 which are radiated from the third input optical fiber 73 and the fourth input optical fiber 74 are reflected on the second light reflection surface 52 and the first light reflection surface 51 and, thereafter, are respectively incident on the second output optical fiber 76 and the first output optical fiber 75. Accordingly, in this changeover state, the first input optical fiber 71 and the fourth output optical fiber 78 are coupled to each other, the second input optical fiber 72 and the third output optical fiber 77 are coupled to each other, the third input optical fiber 73 and the second output optical fiber 76 are coupled to each other, and the fourth input optical fiber 74 and the first output optical fiber 75 are coupled to each other.

SIXTH EMBODIMENT

When the mirror block 50 shown in the first embodiment is used, as can be understood from FIG. 13(a) (b), for example, between the case in which the light 66 which is radiated from the first input optical fiber 32 is reflected on the first light reflection surface 51 and the third light reflection surface 53 and is incident on the first output optical fiber 34 and the case in which the light 66 which is radiated from the first input optical fiber 32 is reflected on the first light reflection surface 51 and the second light reflection surface 52 and is incident on the second output optical fiber 35, the spatial optical path ranging from the radiation of the light 66 from the first light reflection surface 51 to the inputting of light into the first output optical fiber 34 and the spatial optical path ranging from the radiation of the light 66 from the first light reflection surface 51 to the inputting of light 66 into the second output optical fiber 35 differ from each other. Accordingly, the light 66 which is incident on the first output optical fiber 34 and the light 66 which is incident on the second output optical fiber 35 differ in a phase and a diameter of light spot thereof at end surfaces of the fibers. Accordingly, when the optical switch is changed over, the characteristics of an optical signal are changed and hence, there exists a possibility that it is necessary to perform the adjustment of the lens positions or the coupling efficiencies are changed.

Figure 20:
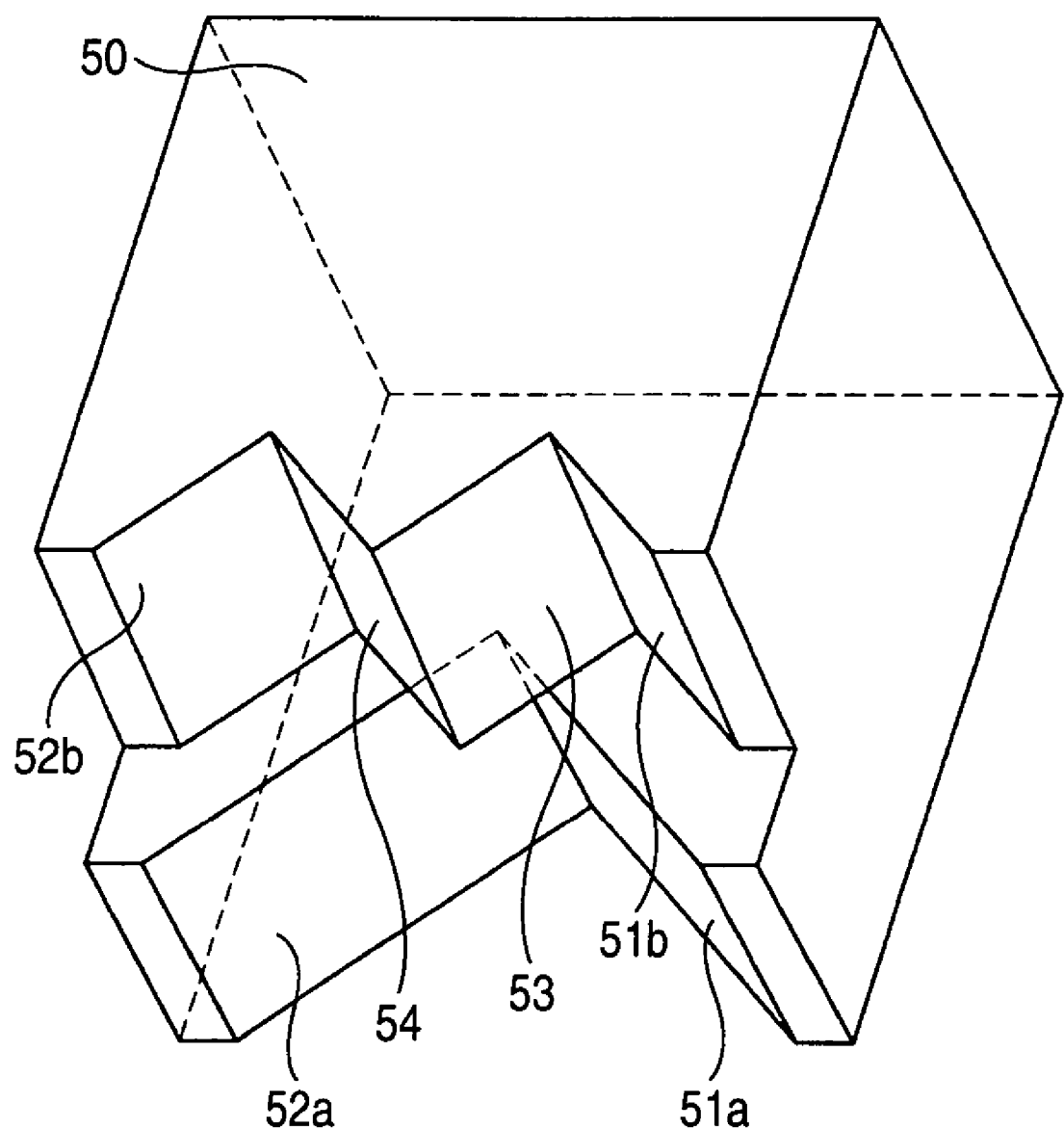
FIG. 20 is a perspective view of a mirror block used in an optical switch according to a sixth embodiment of the invention.

FIG. 20 is a perspective view showing the structure of a mirror block 50 which is optimum for overcoming the above-mentioned drawback. In this mirror block 50, a lower half of a front surface of the mirror block 50 is formed in a V-groove shape due to a first light reflection surface 51a and a second light reflection surface 52a, while an upper half of a front surface of the mirror block 50 is formed in a W-groove shape due to a first light reflection surface 51b, a second light reflection surface 52b, a third light reflection surface 53 and a fourth light reflection surface 54. Further, the first light reflection surface 51b, the second light reflection surface 52b, the third light reflection surface 53 and the fourth light reflection surface 54 which are formed on the upper half are retracted backwardly than the first light reflection surface 51a and the second light reflection surface 52a which are formed on the lower half and hence, even when either one of the upper portion and the lower portion is used, the spatial optical path length is not changed.

Figure 21A:
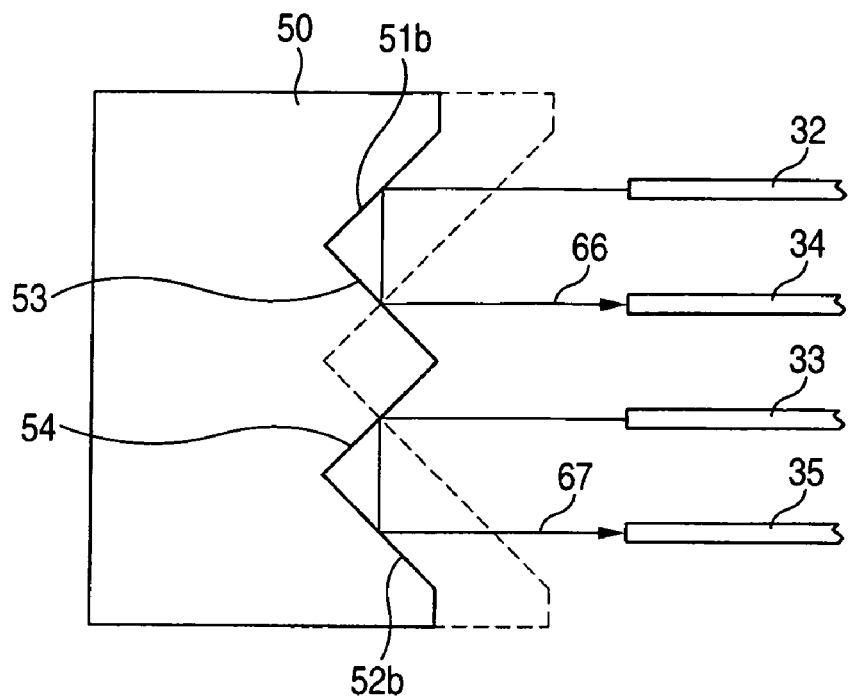
FIG. 21(a), (b) are explanatory views for explaining the operation of the above-mentioned mirror block.
Figure 21B:
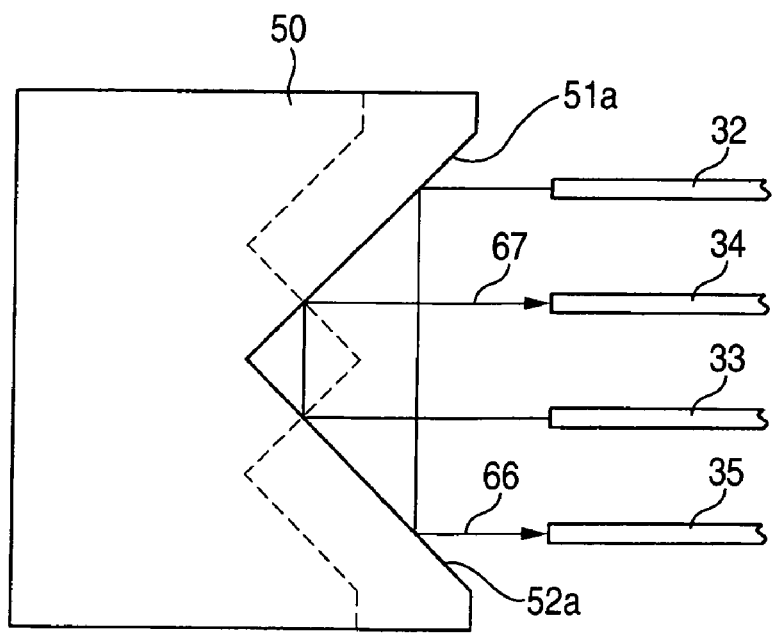

FIG. 21(a), (b) show the state in which the mirror block 50 is lowered and the first light reflection surface 51b, the second light reflection surface 52b, the third light reflection surface 53 and the fourth light reflection surface 54 are used and the state in which the mirror block 50 is elevated and the first light reflection surface 51a and the second light reflection surface 52a are used. As can be understood from the geometric relationship between the optical paths for the light 66 and the light 67 shown in FIG. 13(a), (b), the distance that the spatial optical path length is elongated when the state of the optical switch is changed from the state shown in FIG. 13(a) to FIG. 13(b) is equal with respect to both of the light 66 and the light 67. Accordingly, by retracting the first light reflection surface 51b, the second light reflection surface 52b, the third light reflection surface 53 and the fourth light reflection surface 54 backwardly by a half of this distance, it is possible to prevent the change of the spatial optical path length.

According to this embodiment, the adjustment of the lens positions or the like which is required along with the changeover of the optical switch becomes no more necessary and the change of the coupling rate of light can be prevented.

Here, in the above-mentioned embodiments, although the driven portion 39 of the mirror unit 25 is driven like a seesaw to rotate the mirror block 50, the mirror block 50 may be moved in parallel in the vertical direction by elevating or lowering the driven portion 39. Further, the mirror unit 25 moves the mirror block 50 using the electromagnet, the mirror unit 25 may move the mirror block 50 using other method such as an electrostatic actuator, a voice coil or the like. Further, even when the electromagnet is used, it may be possible that only one electromagnet is used, wherein the mirror block 50 assumes the lowered position when the electromagnet is energized and assumes the elevated position when the electromagnet is deenergized. Further, even when the electromagnet is used, there exists no problem in using the electromagnet of a type which is not latched.

INDUSTRIAL APPLICABILITY

As has been explained heretofore, the invention provides the optical switch for changing over the optical fiber transmission path or the light transmission/reception terminal used in the optical communication and the optical switch is used at the coupling portion between the input optical path (for example, the input optical fiber) and the output optical path (for example, the output optical fiber).

The invention claimed is:

1. An optical switch, comprising:
   at least three input and output optical paths in total, wherein a changeover of the optical paths occurs by changing a combination of an input optical path and an output optical path which transmit light to each other;
   a mirror member comprising a front surface, wherein the mirror member is movable relative to the input optical path and the output optical path, and wherein the front surface is allowed to face the input optical path and the output optical path;
   a first region comprising a pair of light reflection surfaces that cross each other with a given angle; and
   a second region comprising plural pairs of light reflection surfaces such that the neighboring light reflection surfaces cross each other with the given angle,
   wherein the first region and the second region are arranged on the front surface of the mirror member and along the moving direction of the mirror member.

2. The optical switch according to claim 1, wherein the optical switch includes an actuator for moving the mirror member.

3. The optical switch according to claim 1, wherein portions of the input optical path and the output optical path which face the front surface of the mirror member are integrally formed with each other.

4. The optical switch according to claim 1, wherein
   light which is radiated from some input optical path among the plurality of input optical paths is incident on some output optical path among the plurality of output optical paths by being reflected on the light reflection surfaces formed in the first region, and
   light which is radiated from another input optical path is incident on another output optical path by being reflected on the light reflection surfaces formed in the first region,
   while light which is radiated from some input optical path among the plurality of input optical paths is incident on another output optical path among the plurality of output optical paths by being reflected on the light reflection surfaces formed in the second region, and
   light which is radiated from another input optical path is incident on some output optical path by being reflected on the light reflection surfaces formed in the second region.

5. The optical switch according to claim 1, wherein the optical switch includes means which monitors which of the first region and the second region among the front surface of the mirror member faces the input optical path and the output optical path.

6. The optical switch according to claim 1, wherein a spatial optical path length from a position where the light radiated from the input optical path is radiated from the input optical path to a position where the light is incident on the output optical path after being reflected on the light reflection surface in the first region is set equal to a spatial optical path length from a position where the light radiated from the input optical path is radiated from the input optical path to a position where the light is incident on the output optical path after being reflected on the light reflection surface in the second region.

7. The optical switch according to claim 1, wherein the first region and the second region are integrally formed on the mirror member.

\* \* \* \* \*